(12) United States Patent
Bomzon

(10) Patent No.: US 12,131,428 B2
(45) Date of Patent: Oct. 29, 2024

(54) METHODS, SYSTEMS, AND APPARATUSES FOR IMAGE SEGMENTATION

(71) Applicant: Novocure GmbH, Root (CH)

(72) Inventor: Zeev Bomzon, Haifa (IL)

(73) Assignee: Novocure GmbH, Root (CH)

( * ) Notice: Subject to any disclaimer, the term of this patent is extended or adjusted under 35 U.S.C. 154(b) by 0 days.

(21) Appl. No.: 18/508,845

(22) Filed: Nov. 14, 2023

(65) Prior Publication Data

US 2024/0087235 A1   Mar. 14, 2024

Related U.S. Application Data

(62) Division of application No. 17/139,459, filed on Dec. 31, 2020, now Pat. No. 11,941,761.

(60) Provisional application No. 62/955,644, filed on Dec. 31, 2019.

(51) Int. Cl.
| | |
|---|---|
| *G06T 19/00* | (2011.01) |
| *G06T 7/00* | (2017.01) |
| *G06T 7/11* | (2017.01) |
| *G06T 17/20* | (2006.01) |

(52) U.S. Cl.
CPC ............ *G06T 19/00* (2013.01); *G06T 7/0012* (2013.01); *G06T 7/11* (2017.01); *G06T 17/20* (2013.01); *G06T 2207/10081* (2013.01); *G06T 2207/10088* (2013.01); *G06T 2207/30096* (2013.01)

(58) Field of Classification Search
CPC ......... G06T 19/00; G06T 7/0012; G06T 7/11; G06T 17/20; G06T 2207/10081; G06T 2207/10088; G06T 2207/30096; G06T 19/20; G06T 2200/24; G06T 2210/41; G06T 2219/028; G06T 2219/2008
See application file for complete search history.

(56) References Cited

U.S. PATENT DOCUMENTS

| | | | |
|---|---|---|---|
| 7,146,210 B2 | 12/2006 | Palti | |
| 7,565,205 B2 | 7/2009 | Palti | |
| 8,761,493 B2 | 6/2014 | Chen et al. | |
| 9,710,880 B2 | 7/2017 | Xu et al. | |
| 10,188,851 B2 | 1/2019 | Wenger et al. | |
| 10,692,283 B2 | 6/2020 | Liu et al. | |
| 11,013,909 B2 | 5/2021 | Wenger et al. | |
| 11,154,707 B2 | 10/2021 | Bomzon et al. | |
| D934,892 S | 11/2021 | Hershkovich et al. | |
| 11,182,904 B2 | 11/2021 | Wu et al. | |
| 2003/0208295 A1 | 11/2003 | Ishii et al. | |

(Continued)

FOREIGN PATENT DOCUMENTS

| | | |
|---|---|---|
| CN | 105046692 A | 11/2015 |
| CN | 107169919 A | 9/2017 |

(Continued)

OTHER PUBLICATIONS

Yushkevich, et al. "User-Guided Segmentation of Multi-Modality Medical Imaging Datasets with ITK-SNAP," Jan. 2019, 23 pages.

(Continued)

*Primary Examiner* — Molly Wilburn
(74) *Attorney, Agent, or Firm* — McCarter & English, LLP; Michael A. Sartori

(57) ABSTRACT

Methods, systems, and apparatuses are described for interacting with images, segmenting the images, and determining one or more regions of interest within the images.

11 Claims, 16 Drawing Sheets

(56) References Cited

U.S. PATENT DOCUMENTS

| | | | |
|---|---|---|---|
| 2004/0228529 A1* | 11/2004 | Jerebko | G06T 7/12 |
| | | | 382/128 |
| 2009/0136103 A1* | 5/2009 | Sonka | G06V 10/7635 |
| | | | 382/128 |
| 2010/0128946 A1 | 5/2010 | Fidrich et al. | |
| 2011/0050692 A1 | 3/2011 | Zhang et al. | |
| 2011/0106221 A1 | 5/2011 | Neal, II et al. | |
| 2014/0200575 A1 | 7/2014 | Spector | |
| 2015/0356209 A1 | 12/2015 | Han et al. | |
| 2017/0049497 A1 | 2/2017 | Radecke | |
| 2017/0120041 A1 | 5/2017 | Wenger et al. | |
| 2017/0337687 A1* | 11/2017 | Wang | G06T 7/11 |
| 2018/0001075 A1 | 1/2018 | Kirson et al. | |
| 2018/0160933 A1 | 6/2018 | Urman et al. | |
| 2019/0117956 A1 | 4/2019 | Wenger et al. | |
| 2019/0117963 A1 | 4/2019 | Travers et al. | |
| 2019/0308016 A1 | 10/2019 | Wenger et al. | |
| 2020/0114141 A1 | 4/2020 | Bomzon et al. | |
| 2020/0129761 A1 | 4/2020 | Bomzon et al. | |
| 2020/0146586 A1 | 5/2020 | Naveh et al. | |
| 2020/0219261 A1 | 7/2020 | Shamir et al. | |
| 2020/0353245 A1 | 11/2020 | Travers et al. | |
| 2020/0372705 A1 | 11/2020 | Hershkovich et al. | |
| 2021/0060334 A1 | 3/2021 | Avraham et al. | |
| 2021/0089569 A1* | 3/2021 | Arase | G06F 16/583 |
| 2021/0162228 A1 | 6/2021 | Urman et al. | |
| 2021/0187277 A1 | 6/2021 | Wasserman et al. | |
| 2021/0196207 A1 | 7/2021 | Shamir et al. | |
| 2021/0196943 A1 | 7/2021 | Shamir et al. | |
| 2021/0201572 A1 | 7/2021 | Bomzon | |
| 2021/0299439 A1 | 9/2021 | Shamir et al. | |
| 2022/0230408 A1 | 7/2022 | Shah et al. | |

FOREIGN PATENT DOCUMENTS

| | | | |
|---|---|---|---|
| CN | 109558912 A | | 4/2019 |
| EP | 0330797 A3 | | 9/1990 |
| EP | 2290611 A1 | | 3/2011 |
| EP | 2800064 A1 | | 11/2014 |
| GB | 1419660 A | | 12/1975 |
| GB | 2026322 A | | 2/1980 |
| GB | 2043453 A | | 10/1980 |
| JP | 2010-119850 A | | 6/2010 |
| JP | 2014219975 A | | 11/2014 |
| TW | 201719580 A | | 6/2017 |
| WO | 01/60994 A1 | | 8/2001 |
| WO | 2010/120823 A2 | | 10/2010 |
| WO | 2011/047387 A2 | | 4/2011 |
| WO | 2015/067300 A1 | | 5/2015 |
| WO | 2017/072706 A1 | | 5/2017 |
| WO | 2018/057529 A1 | | 3/2018 |
| WO | 2018/109691 A2 | | 6/2018 |
| WO | 2019/103912 A2 | | 5/2019 |
| WO | 2020041693 A1 | | 2/2020 |
| WO | 2020/168035 A1 | | 8/2020 |
| WO | 2020/225599 A1 | | 11/2020 |

OTHER PUBLICATIONS

Tian, et al., "A supervoxel-based segmentation method for prostate MR images," Med Phys, Feb. 2017; 44(2), pp. 558-569.

"Medical Imaging Interaction Toolkit: The Segmentation View," 11 pages, Jul. 2023.

Vincent, et al., "MNI Display—Software for Visualization and Segmentation of Surfaces and Volumes," 52 pages, Jun. 29, 2016.

Office Action in EP Application No. 22177340.1 dated Nov. 21, 2022.

C. Wenger et al., "A Review on Tumor-Treating Fields (TTFields): Clinical Implications Inferred From Computational Modeling," in IEEE Reviews in Biomedical Engineering, vol. 11, pp. 195-207, 2018.

Liu et al., "A Survey of MRI-Based Brain Tumor Segmentation Methods," Tsinghua Science and Technology, vol. 19, No. 6, Dec. 2014, pp. 578-595.

Pham et al., "A Survey of Current Methods in Medical Image Segmentation," Image Segmentation, Technical Report, Jan. 19, 1998, 26 pages.

Ballo, et al., "Correlation of Tumor Treating Fields Dosimetry to Survival Outcomes in Newly Diagnosed Glioblastoma: A Large-Scale Numerical Simulation-Based Analysis of Data from the Phase 3 EF-14 Randomized Trial," International Journal of Radiation Oncology, Biology, Physics, 2019; 104(5), pp. 1106-1113.

* cited by examiner

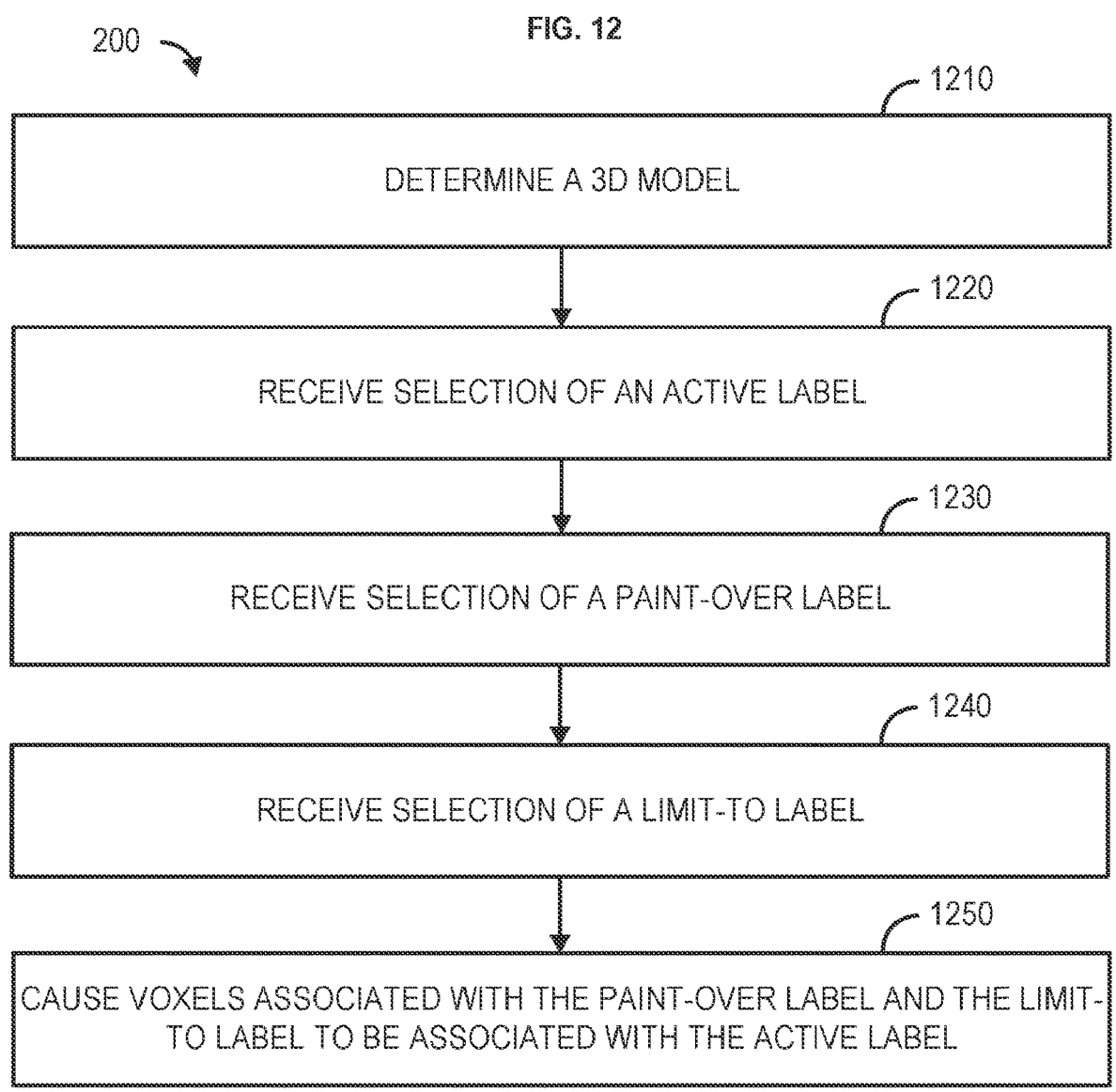

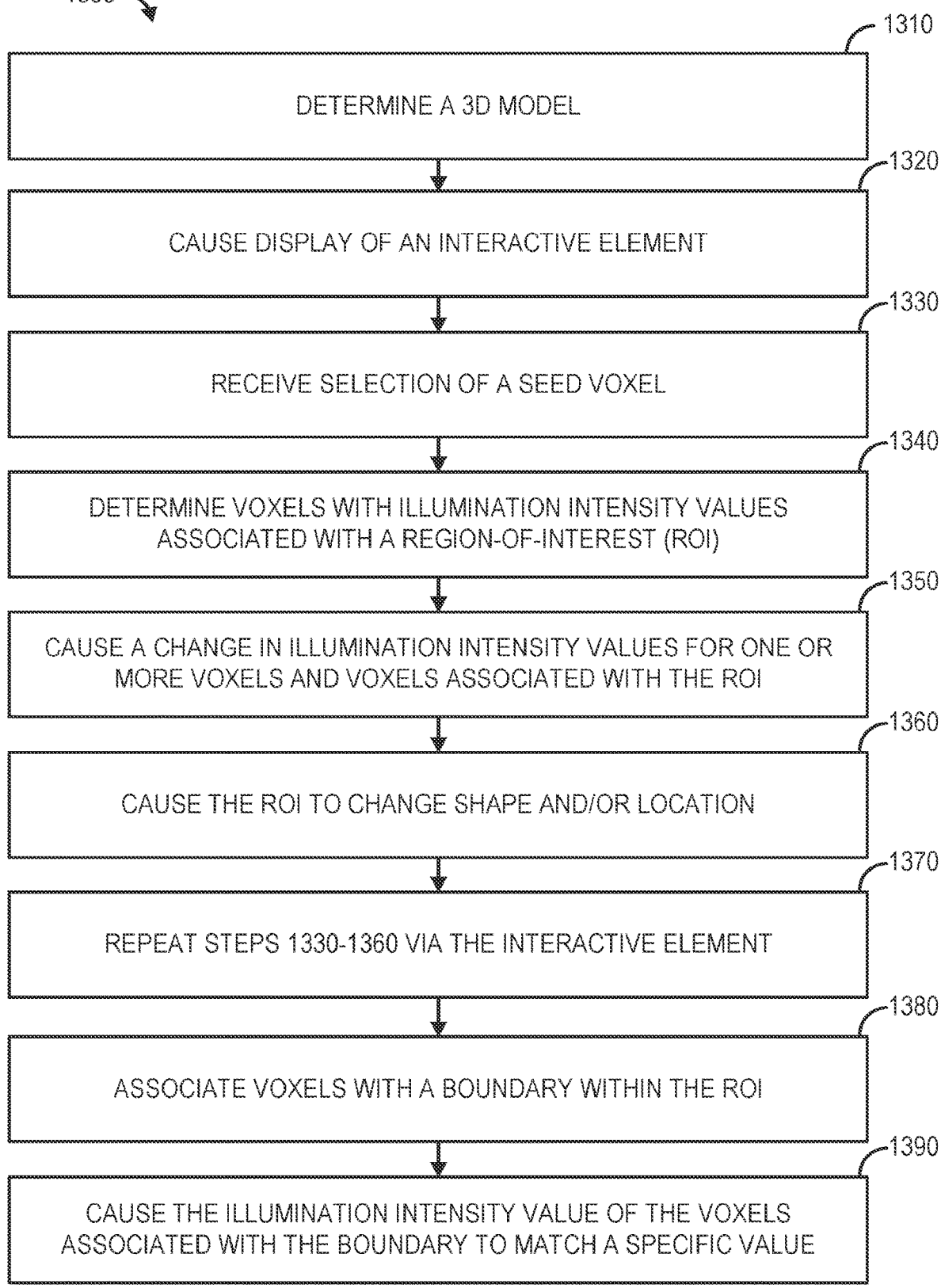

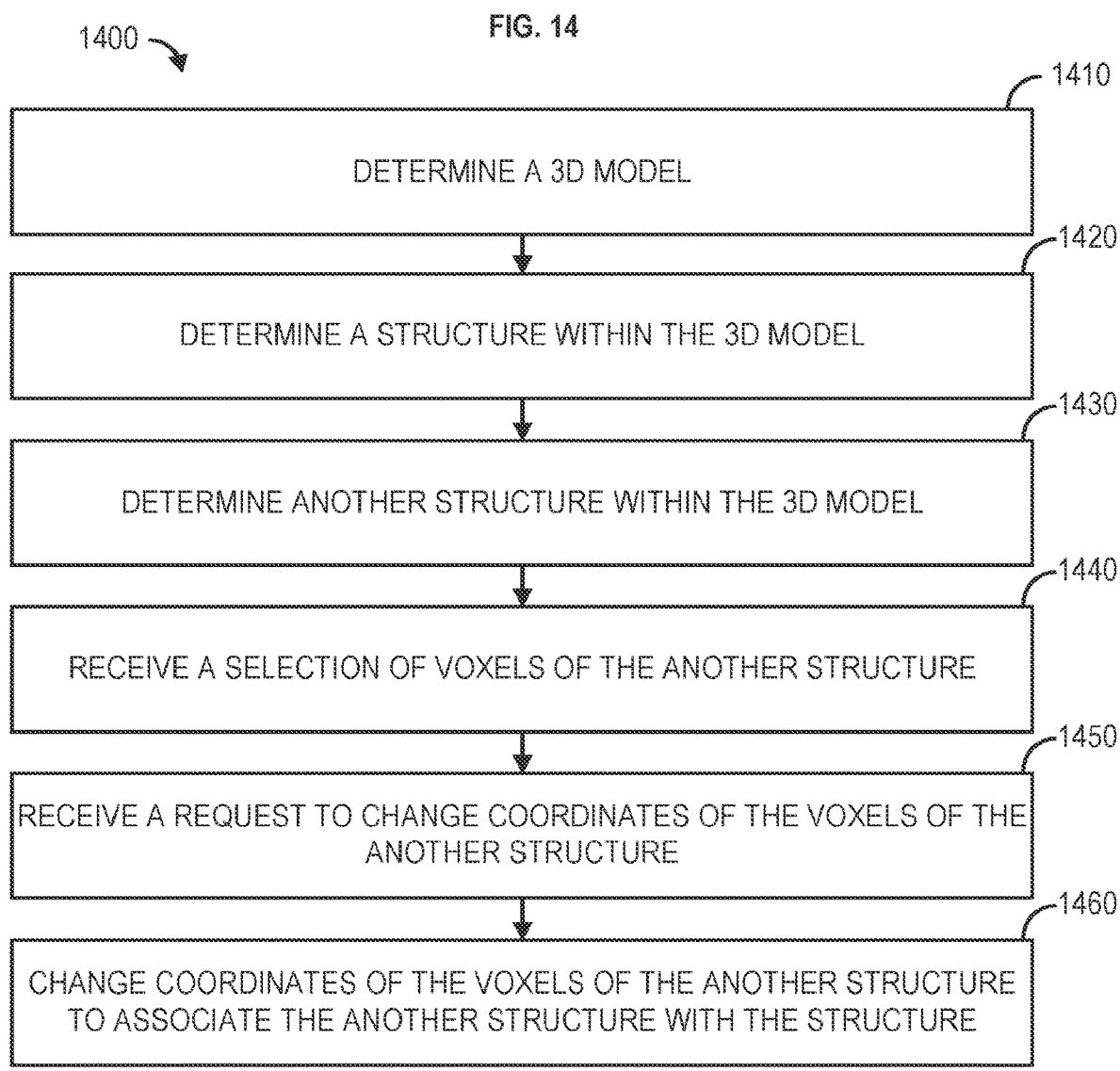

METHODS, SYSTEMS, AND APPARATUSES FOR IMAGE SEGMENTATION

CROSS-REFERENCE TO RELATED PATENT APPLICATION

This application is a divisional of U.S. patent application Ser. No. 17/139,459, filed Dec. 31, 2020, which claims priority to U.S. Provisional Application No. 62/955,644 filed Dec. 31, 2019, each of which is herein incorporated by reference in its entirety.

BACKGROUND

Tumor Treating Fields, or TTFields, are low intensity (e.g., 1-3 V/cm) alternating electric fields within the intermediate frequency range (100-300 kHz). This non-invasive treatment targets solid tumors and is described in U.S. Pat. No. 7,565,205, which is incorporated herein by reference in its entirety. TTFields disrupt cell division through physical interactions with key molecules during mitosis. TTFields therapy is an approved mono-treatment for recurrent glioblastoma and approved combination therapy with chemotherapy for newly diagnosed patients. These electric fields are induced non-invasively by transducer arrays (i.e., arrays of electrodes) placed directly on the patient's scalp. TTFields also appear to be beneficial for treating tumors in other parts of the body. Image segmentation tools may be used to optimize TTFields treatment planning. Image segmentation tools require interaction with multiple screens and/or interfaces, are unable to effectively limit segmentation to specific regions or boundaries within images, and require complex actions/procedures to assign structures within images to different structures.

SUMMARY

Described are methods comprising determining a three-dimensional (3D) model, wherein the 3D model comprises a plurality of voxels, receiving an indication of a selection of an active label, wherein the selection of the active label enables a user indicator to cause voxels of the plurality of voxels that are interacted with to be associated with the active label, receiving an indication of a selection of a paint-over label, wherein the selection of the paint-over label causes voxels of the plurality of voxels not associated with the paint-over label to be write-protected from being associated with the active label, receiving an indication of a selection of a limit-to label that specifies a structure within the 3D model, wherein the selection of the limit-to label causes voxels of the plurality of voxels that are not associated with the structure within the 3D model to be write-protected from being associated with the active label, and causing one or more voxels of the plurality of voxels associated with the paint-over label and the limit-to label to be associated with the active label based on an interaction with the one or more voxels via the user indicator Also described are methods comprising (a) determining a three-dimensional (3D) model, wherein the 3D model comprises a plurality of voxels, wherein each voxel of the plurality of voxels is associated with an illumination intensity value, wherein each voxel of the plurality of voxels is associated with a represented foreground of the 3D model or a represented background of the 3D model based on the respective illumination intensity value, (b) causing display of an interactive element, (c) receiving, via the interactive element, an indication of a selection of a seed voxel, wherein the seed voxel is associated with an illumination intensity of a specific value, (d) determining one or more voxels of the plurality of voxels with illumination intensity values within a threshold range of the specific value, wherein the one or more voxels of the plurality of voxels with the illumination intensity values within the threshold range of the specific value are associated with a region of interest (ROI) within the 3D structure, (e) causing one or more of a change in the illumination intensity values of one or more voxels associated with the ROI and a change of the illumination intensity values of one or more voxels of the plurality of voxels, (f) causing, based on one or more of the change in the illumination intensity values of the one or more voxels associated with the ROI, and the change of the illumination intensity values of the one or more voxels of the plurality of voxels, one or more of a change in a represented shape of the ROI, and a change in a location of the ROI within the 3D model, (g) repeating, based on an interaction with the interactive element via a user indicator, one or more of steps (c)-(f), (h) associating, based on another interaction with the interactive element via the user indicator, one or more voxels of the plurality of voxels with a boundary within the ROI, wherein the illumination intensity values of the one or more voxels associated with the boundary match the specific value, and (i) causing the illumination intensity value of one or more voxels within the boundary to match the specific value.

Also described are methods comprising determining a three-dimensional (3D) model, wherein the 3D model comprises a plurality of voxels, wherein each voxel of the plurality of voxels is associated with coordinates within the 3D model, determining a structure within the 3D model, wherein the structure comprises one or more voxels of the plurality of voxels, determining another structure within the 3D model, wherein the another structure comprises another one or more voxels of the plurality of voxels, receiving, an indication of a selection of the another one or more voxels, receiving, based on the indication of the selection of the another one or more voxels, a request to change the coordinates of the another one or more voxels, and changing, based on the request, the coordinates of the another one or more voxels, wherein changing the coordinates associates the another structure with the structure.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

To easily identify the discussion of any particular element or act, the most significant digit or digits in a reference number refer to the figure number in which that element is first introduced.

FIG. 12 shows an example method.

FIG. 13 shows an example method.

FIG. 14 shows an example method.

DETAILED DESCRIPTION

Figure 1:
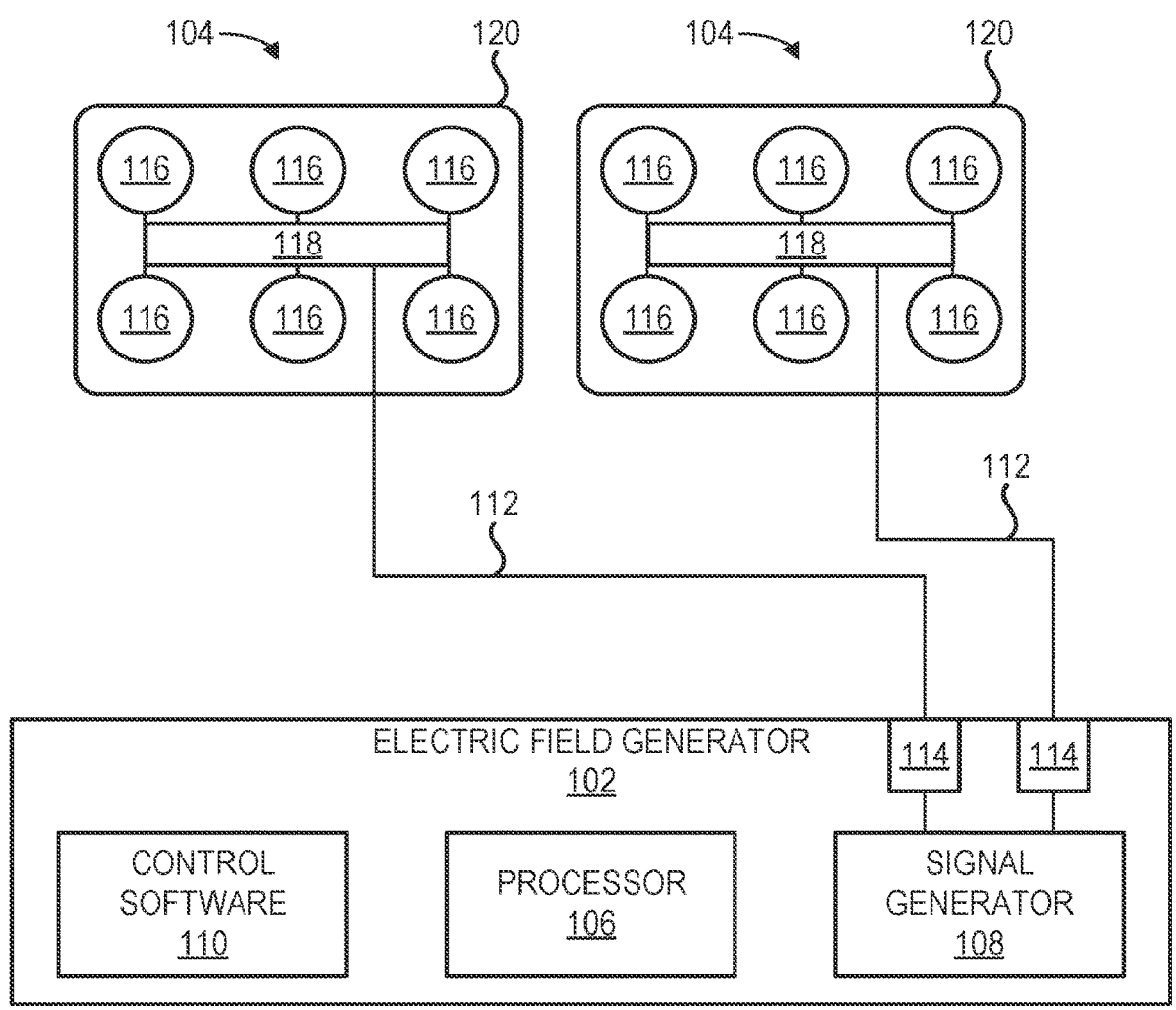
FIG. 1 shows an example apparatus for electrotherapeutic treatment.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

TTFields, also referred to herein as alternating electric fields, are established as an anti-mitotic cancer treatment modality because they interfere with a proper microtubule assembly during metaphase and eventually destroy the cells during telophase and cytokinesis. The efficacy increases with increasing field strength and the optimal frequency are cancer cell line dependent with 200 kHz being the frequency for which inhibition of glioma cells growth caused by TTFields is highest. For cancer treatment, non-invasive devices were developed with capacitively coupled transducers that are placed directly at the skin region close to the tumor, for example, for patients with Glioblastoma Multiforme (GBM), the most common primary, malignant brain tumor in humans.

Because the effect of TTFields is directional with cells dividing parallel to the field affected more than cells dividing in other directions, and because cells divide in all directions, TTFields are typically delivered through two pairs of transducer arrays that generate perpendicular fields within the treated tumor. More specifically, one pair of transducer arrays may be located to the left and right (LR) of the tumor, and the other pair of transducer arrays may be located anterior and posterior (AP) to the tumor. Cycling the field between these two directions (i.e., LR and AP) ensures that a maximal range of cell orientations is targeted. Other positions of transducer arrays are contemplated beyond perpendicular fields. In an embodiment, asymmetric positioning of three transducer arrays is contemplated wherein one pair of the three transducer arrays may deliver alternating electric fields and then another pair of the three transducer arrays may deliver the alternating electric fields, and the remaining pair of the three transducer arrays may deliver the alternating electric fields.

In-vivo and in-vitro studies show that the efficacy of TTFields therapy increases as the intensity of the electric field increases. Therefore, optimizing array placement on the patient's scalp to increase the intensity in the diseased region of the brain is standard practice for the Optune system. Array placement optimization may be performed by "rule of thumb" (e.g., placing the arrays on the scalp as close to the tumor as possible), measurements describing the geometry of the patient's head, tumor dimensions, and/or tumor location. Measurements used as input may be derived from imaging data. Imaging data is intended to include any type of visual data, for example, single-photon emission computed tomography (SPECT) image data, x-ray computed tomography (x-ray CT) data, magnetic resonance imaging (MRI) data, positron emission tomography (PET) data, data that can be captured by an optical instrument (e.g., a photographic camera, a charge-coupled device (CCD) camera, an infrared camera, etc.), and the like. In certain implementations, image data may include 3D data obtained from or generated by a 3D scanner (e.g., point cloud data). Optimization can rely on an understanding of how the electric field distributes within the head as a function of the positions of the array and, in some aspects, take account for variations in the electrical property distributions within the heads of different patients.

FIG. 1 shows an example apparatus 100 for electrotherapeutic treatment. Generally, the apparatus 100 may be a portable, battery or power supply operated device which produces alternating electric fields within the body through non-invasive surface transducer arrays. The apparatus 100 may comprise an electric field generator 102 and one or more transducer arrays 104. The apparatus 100 may be configured to generate tumor treatment fields (TTFields) (e.g., at 150 kHz) via the electric field generator 102 and deliver the TTFields to an area of the body through the one or more transducer arrays 104. The electric field generator 102 may be a battery and/or power supply operated device. In an embodiment, the one or more transducer arrays 104 are uniformly shaped. In an embodiment, the one or more transducer arrays 104 are not uniformly shaped.

The electric field generator 102 may comprise a processor 106 in communication with a signal generator 108. The electric field generator 102 may comprise control software 110 configured for controlling the performance of the processor 106 and the signal generator 108.

The signal generator 108 may generate one or more electric signals in the shape of waveforms or trains of pulses. The signal generator 108 may be configured to generate an alternating voltage waveform at frequencies in the range from about 50 kHz to about 500 kHz (preferably from about 100 kHz to about 300 kHz) (e.g., the TTFields). The voltages are such that the electric field intensity in tissue to be treated is in the range of about 0.1 V/cm to about 10 V/cm.

One or more outputs 114 of the electric field generator 102 may be coupled to one or more conductive leads 112 that are attached at one end thereof to the signal generator 108. The opposite ends of the conductive leads 112 are connected to the one or more transducer arrays 104 that are activated by the electric signals (e.g., waveforms). The conductive leads 112 may comprise standard isolated conductors with a flexible metal shield and can be grounded to prevent the spread of the electric field generated by the conductive leads 112. The one or more outputs 114 may be operated sequentially. Output parameters of the signal generator 108 may comprise, for example, an intensity of the field, a frequency of the waves (e.g., treatment frequency), and a maximum allowable temperature of the one or more transducer arrays 104. The output parameters may be set and/or determined by the control software 110 in conjunction with the processor 106. After determining a desired (e.g., optimal) treatment frequency, the control software 110 may cause the processor 106 to send a control signal to the signal generator 108 that causes the signal generator 108 to output the desired treatment frequency to the one or more transducer arrays 104.

The one or more transducer arrays 104 may be configured in a variety of shapes and positions to generate an electric field of the desired configuration, direction, and intensity at a target volume to focus treatment. The one or more transducer arrays 104 may be configured to deliver two perpendicular field directions through a volume of interest.

The one or more transducer arrays 104 arrays may comprise one or more electrodes 116. The one or more electrodes 116 may be made from any material with a high dielectric constant. The one or more electrodes 116 may comprise, for example, one or more insulated ceramic discs. The electrodes 116 may be biocompatible and coupled to a flexible circuit board 118. The electrodes 116 may be configured to not come into direct contact with the skin as the electrodes 116 are separated from the skin by a layer of conductive hydrogel (not shown) (similar to that found on electrocardiogram pads).

The electrodes 116, the hydrogel, and the flexible circuit board 118 may be attached to a hypoallergenic medical adhesive bandage 120 to keep the one or more transducer arrays 104 in place on the body and in continuous direct contact with the skin. Each transducer array 104 may comprise one or more thermistors (not shown), for example, 8 thermistors, (accuracy ±1° C.) to measure skin temperature beneath the transducer arrays 104. The thermistors may be configured to measure skin temperature periodically, for example, every second. The thermistors may be read by the control software 110 while the TTFields are not being delivered to avoid any interference with the temperature measurements.

If the temperature measured is below a pre-set maximum temperature (Tmax), for example, 38.5-40.0° C.±0.3° C., between two subsequent measures, the control software 110 can increase current until the current reaches maximal treatment current (for example, 4 Amps peak-to-peak). If the temperature reaches Tmax+0.3° C. and continues to rise, the control software 110 can lower the current. If the temperature rises to 41° C., the control software 110 can shut off the TTFields therapy and an overheating alarm can be triggered.

Figure 2:
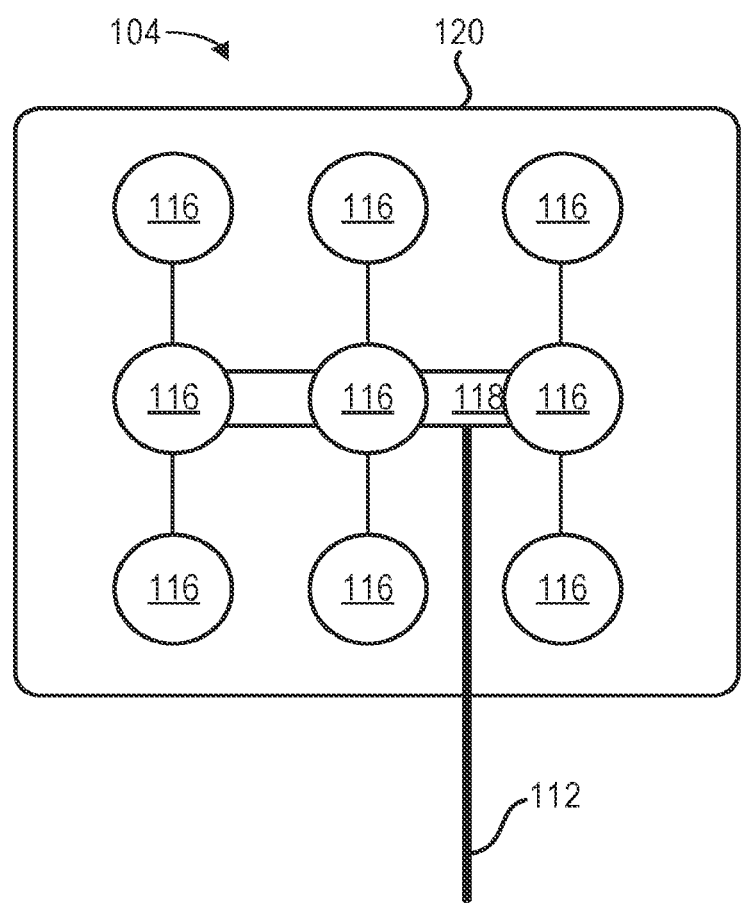
FIG. 2 shows an example transducer array.

The one or more transducer arrays 104 may vary in size and may comprise varying numbers of electrodes 116, based on patient body sizes and/or different therapeutic treatments. For example, in the context of the chest of a patient, small transducer arrays may comprise 13 electrodes each, and large transducer arrays may comprise 20 electrodes each, with the electrodes serially interconnected in each array. For example, as shown in FIG. 2, in the context of the head of a patient, each transducer array may comprise 9 electrodes each, with the electrodes serially interconnected in each array.

Alternative constructions for the one or more transducer arrays 104 are contemplated and may also be used, including, for example, transducer arrays that use ceramic elements that are not disc-shaped, and transducer arrays that use non-ceramic dielectric materials positioned over a plurality of flat conductors. Examples of the latter include polymer films disposed over pads on a printed circuit board or over flat pieces of metal. Transducer arrays that use electrode elements that are not capacitively coupled may also be used. In this situation, each element of the transducer array would be implemented using a region of a conductive material that is configured for placement against a subject/patient's body, with no insulating dielectric layer disposed between the conductive elements and the body. Other alternative constructions for implementing the transducer arrays may also be used. Any transducer array (or similar device/component) configuration, arrangement, type, and/or the like may be used for the methods and systems described herein as long as the transducer array (or similar device/component) configuration, arrangement, type, and/or the like is (a) capable of delivering TTFields to the subject/patient's body and (b) and may be positioned arranged, and/or placed on a portion of a patient/subject's body as described herein.

A status of the apparatus 100 and monitored parameters may be stored a memory (not shown) and can be transferred to a computing device over a wired or wireless connection. The apparatus 100 may comprise a display (not shown) for displaying visual indicators, such as, power on, treatment on, alarms, and low battery.

Figure 3A:
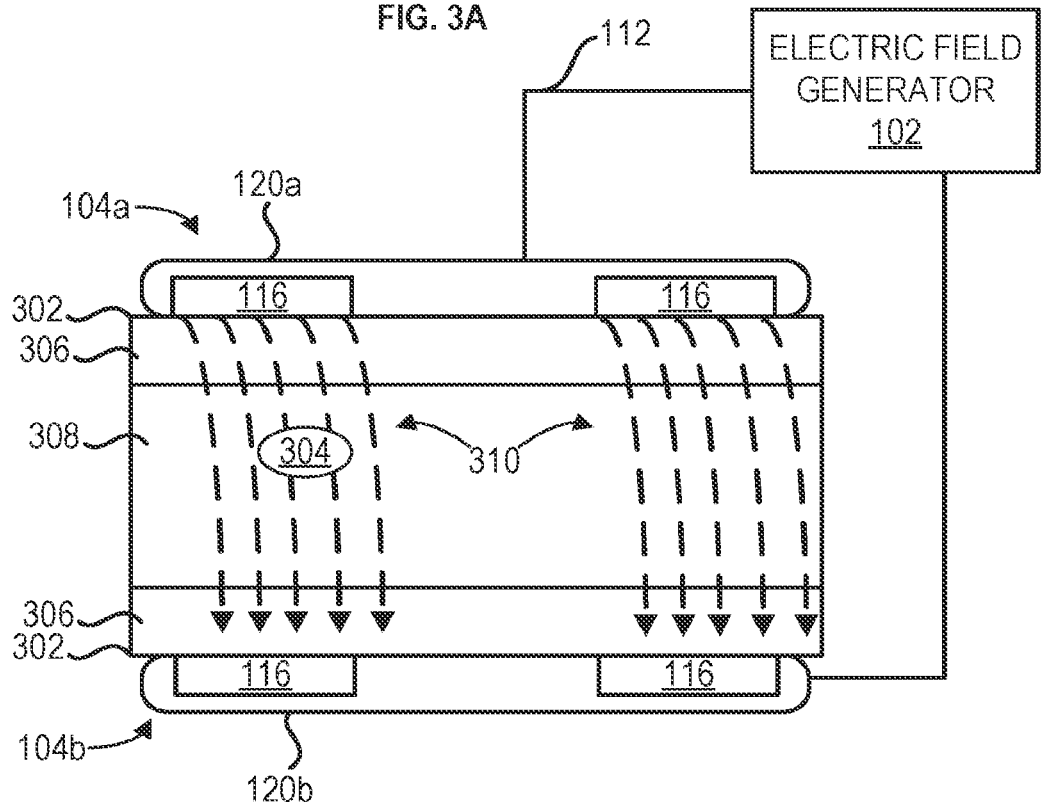
FIG. 3A and FIG. 3B illustrate an example application of the apparatus for electrotherapeutic treatment.
Figure 3B:
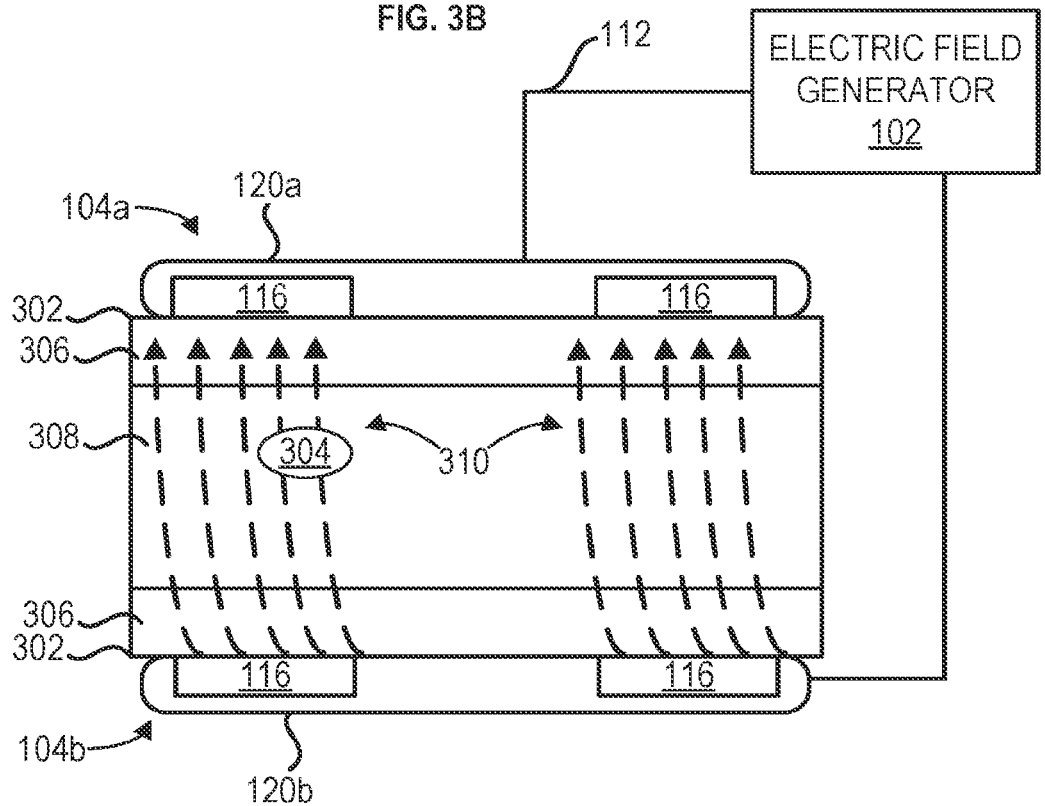

FIG. 3A and FIG. 3B illustrate an example application of the apparatus 100. A transducer array 104a and a transducer array 104b are shown, each incorporated into a hypoallergenic medical adhesive bandage 120a and 120b, respectively. The hypoallergenic medical adhesive bandages 120a and 120b are applied to skin surface 302. A tumor 304 is located below the skin surface 302 and bone tissue 306 and is located within brain tissue 308. The electric field generator 102 causes the transducer array 104a and the transducer array 104b to generate alternating electric fields 310 within the brain tissue 308 that disrupt rapid cell division exhibited by cancer cells of the tumor 304. The alternating electric fields 310 have been shown in non-clinical experiments to arrest the proliferation of tumor cells and/or to destroy them. Use of the alternating electric fields 310 takes advantage of the special characteristics, geometrical shape, and rate of dividing cancer cells, which make them susceptible to the effects of the alternating electric fields 310. The alternating electric fields 310 alter their polarity at an intermediate frequency (on the order of 100-300 kHz). The frequency used for a particular treatment may be specific to the cell type being treated (e.g., 150 kHz for MPM). The alternating electric fields 310 have been shown to disrupt mitotic spindle microtubule assembly and to lead to dielectrophoretic dislocation of intracellular macromolecules and organelles during cytokinesis. These processes lead to the physical disruption of the cell membrane and programmed cell death (apoptosis).

Because the effect of the alternating electric fields 310 is directional with cells dividing parallel to the field affected more than cells dividing in other directions, and because cells divide in all directions, alternating electric fields 310 may be delivered through two pairs of transducer arrays 104 that generate perpendicular fields within the treated tumor. More specifically, one pair of transducer arrays 104 may be located to the left and right (LR) of the tumor, and the other pair of transducer arrays 104 may be located anterior and posterior (AP) to the tumor. Cycling the alternating electric fields 310 between these two directions (e.g., LR and AP) ensures that a maximal range of cell orientations is targeted. In an embodiment, the alternating electric fields 310 may be delivered according to a symmetric setup of transducer arrays 104 (e.g., four total transducer arrays 104, two matched pairs). In another embodiment, the alternating electric fields 310 may be delivered according to an asymmetric setup of transducer arrays 104 (e.g., three total transducer arrays 104). An asymmetric setup of transducer arrays 104 may engage two of the three transducer arrays 104 to deliver the alternating electric fields 310 and then switch to another two of the three transducer arrays 104 to deliver the alternating electric fields 310, and the like.

In-vivo and in-vitro studies show that the efficacy of TTFields therapy increases as the intensity of the electric field increases. The methods, systems, and apparatuses described are configured for optimizing array placement on the patient's scalp to increase the intensity in the diseased region of the brain.

Figure 4A:
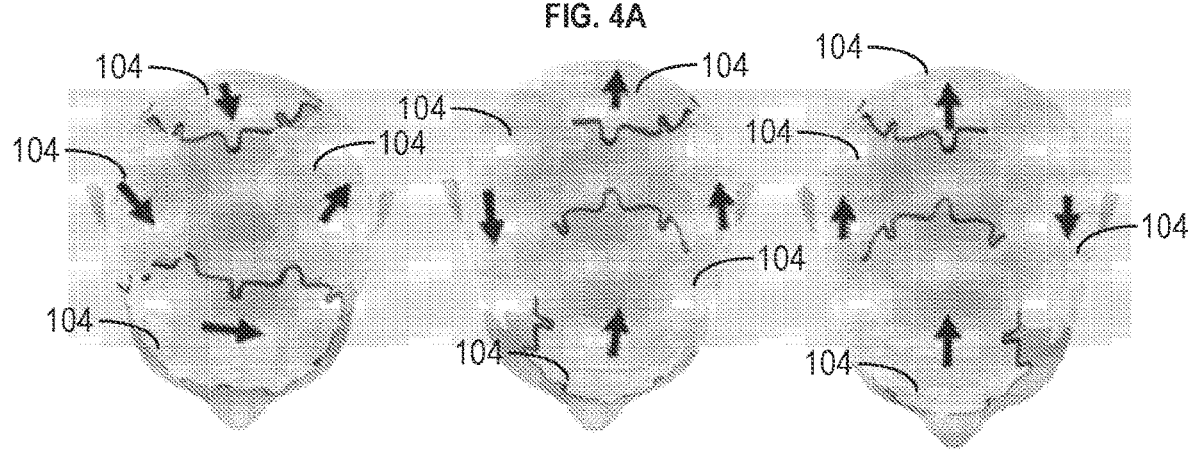
FIG. 4A shows transducer arrays placed on a patient's head.
Figure 4B:
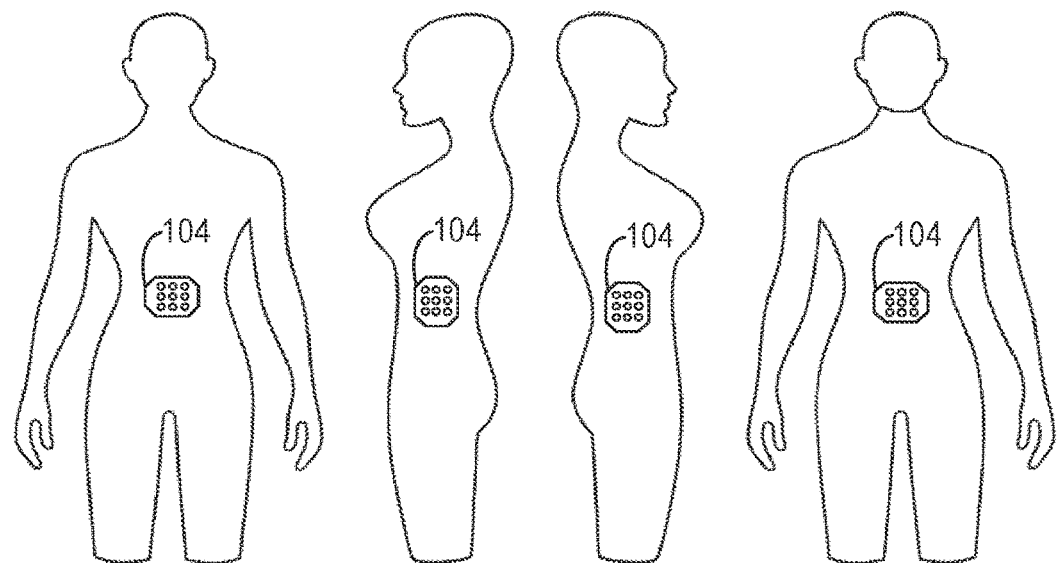
FIG. 4B shows transducer arrays placed on a patient's abdomen.
Figure 5A:
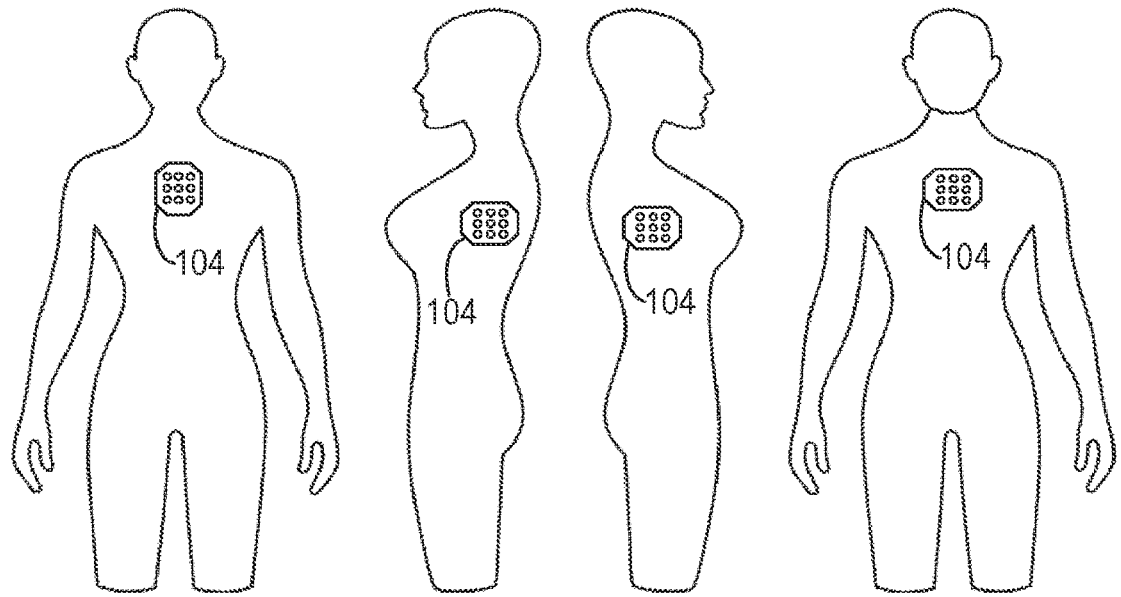
FIG. 5A, the transducer arrays placed on a patient's torso.
Figure 5B:
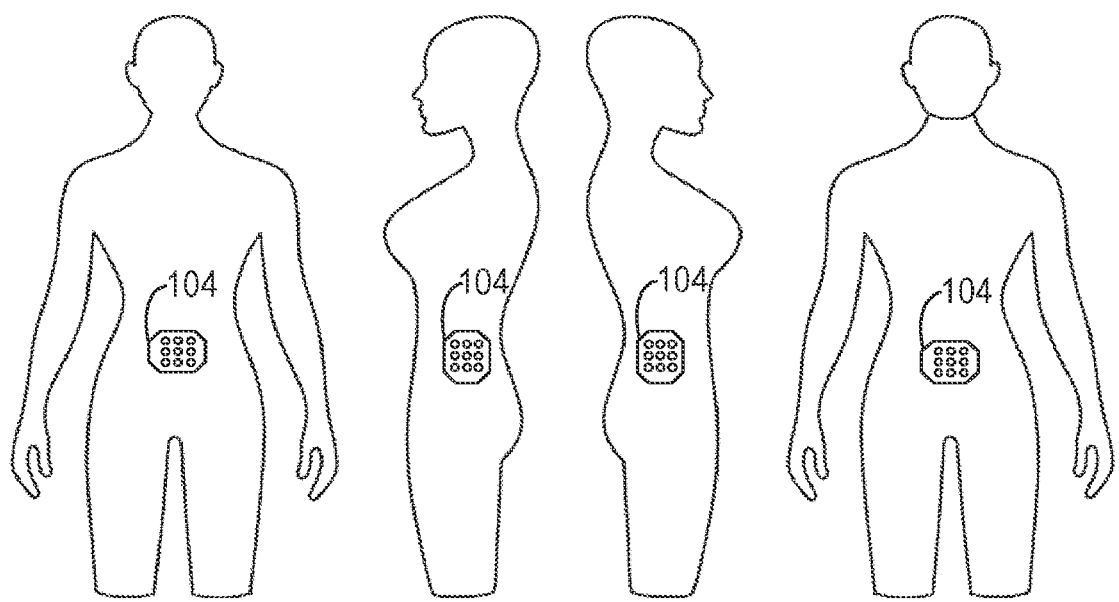
FIG. 5B shows transducer arrays placed on a patient's pelvis

As shown in FIG. 4A, the transducer arrays 104 may be placed on a patient's head. As shown in FIG. 4B, the transducer arrays 104 may be placed on a patient's abdomen. As shown in FIG. 5A, the transducer arrays 104 may be placed on a patient's torso. As shown in FIG. 5B, the transducer arrays 104 may be placed on a patient's pelvis. Placement of the transducer arrays 104 on other portions of a patient's body (e.g., arm, leg, etc.) are specifically contemplated.

Figure 6:
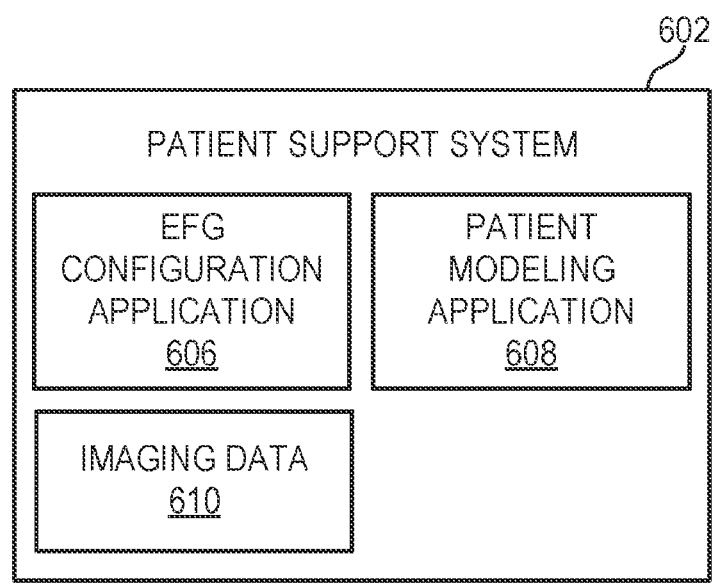
FIG. 6 is a block diagram depicting an electric field generator and a patient support system.

FIG. 6 is a block diagram depicting non-limiting examples of a system 600 comprising a patient support system 602. The patient support system 602 can comprise one or multiple computers configured to operate and/or store an electric field generator (EFG) configuration application 606, a patient modeling application 608, and/or imaging data 610. The patient support system 602 can comprise, for example, a computing device. The patient support system 602 can comprise, for example, a laptop computer, a desktop computer, a mobile phone (e.g., a smartphone), a tablet, and the like.

The patient modeling application 608 may be configured to generate a three dimensional model of a portion of a body of a patient (e.g., a patient model) according to the imaging data 610. The imaging data 610 may comprise any type of visual data, for example, single-photon emission computed tomography (SPECT) image data, x-ray computed tomography (x-ray CT) data, magnetic resonance imaging (MRI) data, positron emission tomography (PET) data, data that can be captured by an optical instrument (e.g., a photographic camera, a charge-coupled device (CCD) camera, an infrared camera, etc.), and the like. In certain implementations, image data may include 3D data obtained from or generated by a 3D scanner (e.g., point cloud data). The patient modeling application 608 may also be configured to generate a three-dimensional array layout map based on the patient model and one or more electric field simulations.

Figure 7:
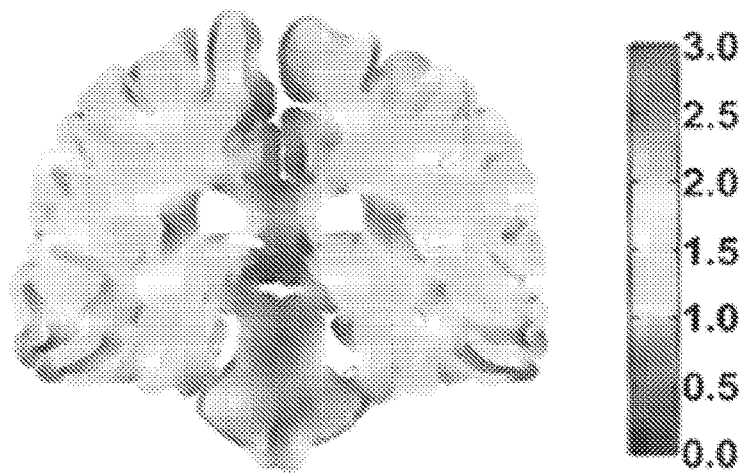
FIG. 7 illustrates electric field magnitude and distribution (in V/cm) shown in coronal view from a finite element method simulation model.

To properly optimize array placement on a portion of a patient's body, the imaging data 610, such as MRI imaging data, may be analyzed by the patient modeling application 608 to identify a region of interest that comprises a tumor. In the context of a patient's head, to characterize how electric fields behave and distribute within the human head, modeling frameworks based on anatomical head models using Finite Element Method (FEM) simulations may be used. These simulations yield realistic head models based on magnetic resonance imaging (MRI) measurements and compartmentalize tissue types such as skull, white matter, gray matter, and cerebrospinal fluid (CSF) within the head. Each tissue type may be assigned dielectric properties for relative conductivity and permittivity, and simulations may be run whereby different transducer array configurations are applied to the surface of the model to understand how an externally applied electric field, of preset frequency, will distribute throughout any portion of a patient's body, for example, the brain. The results of these simulations, employing paired array configurations, a constant current, and a preset frequency of 200 kHz, have demonstrated that electric field distributions are relatively non-uniform throughout the brain and that electric field intensities exceeding 1 V/cm are generated in most tissue compartments except CSF. These results are obtained assuming total currents with a peak-to-peak value of 1800 milliamperes (mA) at the transducer array-scalp interface. This threshold of electric field intensity is sufficient to arrest cellular proliferation in glioblastoma cell lines. Additionally, by manipulating the configuration of paired transducer arrays, it is possible to achieve an almost tripling of electric field intensity to a particular region of the brain as shown in FIG. 7. FIG. 7 illustrates electric field magnitude and distribution (in V/cm) shown in the coronal view from a finite element method simulation model. This simulation employs a left-right paired transducer array configuration.

Figure 8A:
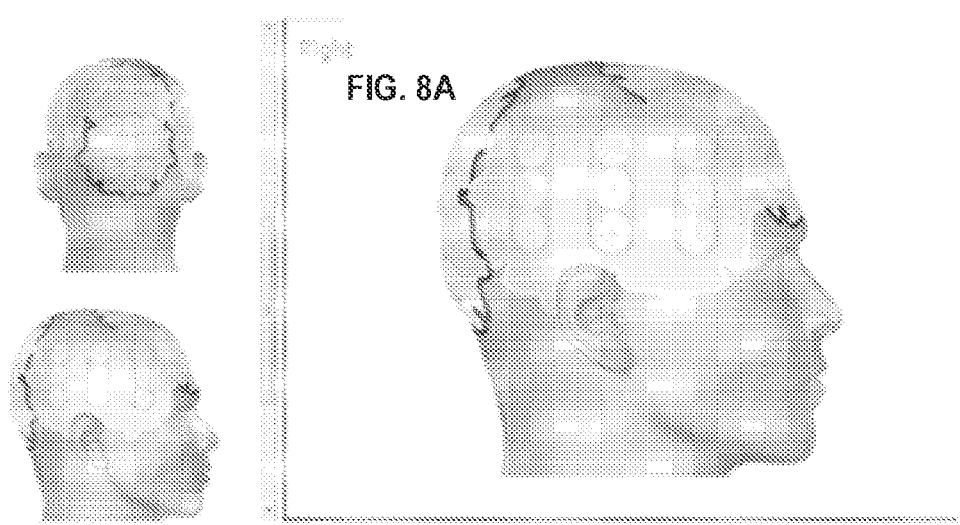
FIG. 8A shows a three-dimensional array layout map 800.
Figure 8B:
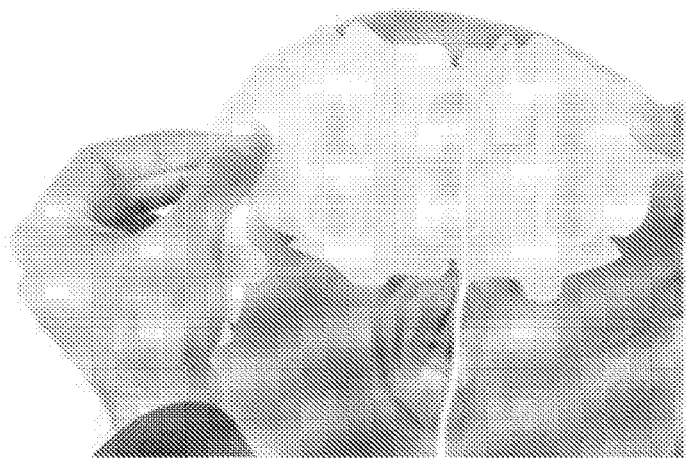
FIG. 8B shows the placement of transducer arrays on the scalp of a patient.

In an aspect, the patient modeling application 608 may be configured to determine a desired (e.g., optimal) transducer array layout for a patient based on the location and extent of the tumor. For example, initial morphometric head size measurements may be determined from the T1 sequences of a brain MRI, using axial and coronal views. Postcontrast axial and coronal MRI slices may be selected to demonstrate the maximal diameter of enhancing lesions. Employing measures of head size and distances from predetermined fiducial markers to tumor margins, varying permutations, and combinations of paired array layouts may be assessed to generate the configuration which delivers maximal electric field intensity to the tumor site. As shown in FIG. 8A, the output may be a three-dimensional array layout map 800. The three-dimensional array layout map 800 may be used by the patient and/or caregiver in arranging arrays on the scalp during the normal course of TTFields therapy as shown in FIG. 8B.

In an aspect, the patient modeling application 608 can be configured to determine the three-dimensional array layout map for a patient. MRI measurements of the portion of the patient that is to receive the transducer arrays may be determined. By way of example, the MRI measurements may be received via a standard Digital Imaging and Communications in Medicine (DICOM) viewer. MRI measurement determination may be performed automatically, for example by way of artificial intelligence techniques or may be performed manually, for example by way of a physician.

Figure 9A:
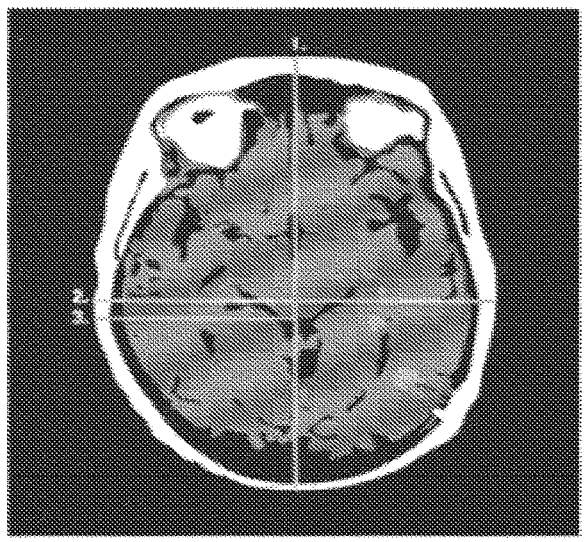
FIG. 9A shows an axial T1 sequence slice containing a most apical image, including orbits used to measure head size.
Figure 9B:
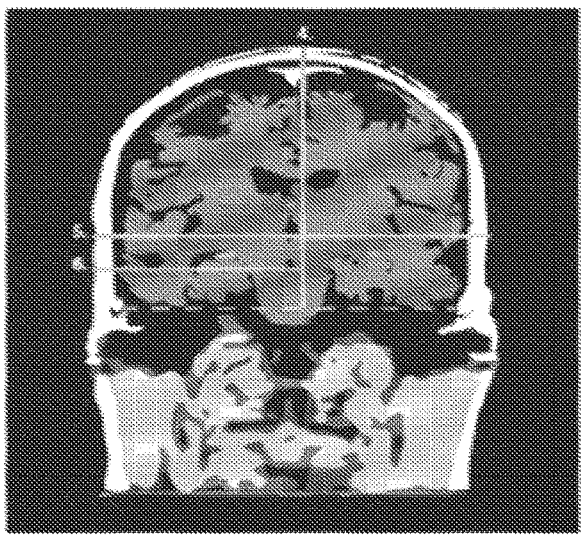
FIG. 9B shows a coronal T1 sequence slice selecting an image at the level of ear canal used to measure head size.
Figure 9C:
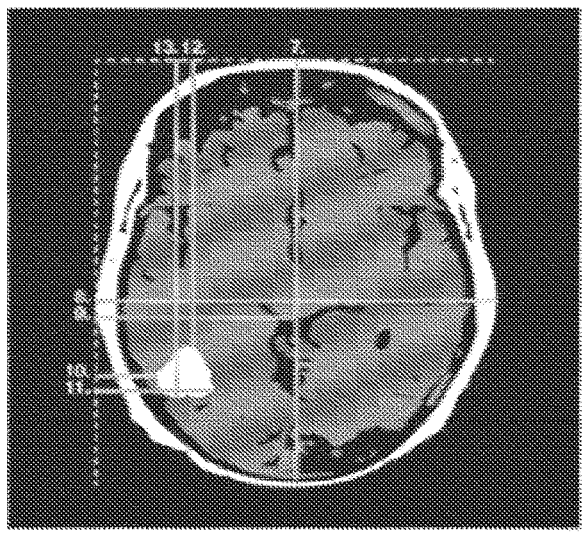
FIG. 9C shows a postcontrast T1 axial image shows maximal enhancing tumor diameter used to measure tumor location.
Figure 9D:
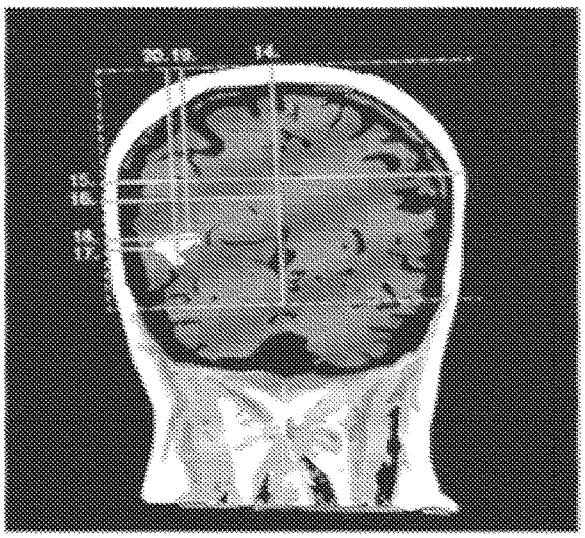
FIG. 9D shows a postcontrast T1 coronal image shows maximal enhancing tumor diameter used to measure tumor location.

Manual MRI measurement determination may comprise receiving and/or providing MRI data via a DICOM viewer. The MRI data may comprise scans of the portion of the patient that contains a tumor. By way of example, in the context of the head of a patient, the MRI data may comprise scans of the head that comprise one or more of a right frontotemporal tumor, a right parietal-temporal tumor, a left frontotemporal tumor, a left parieto-occipital tumor, and/or a multi-focal midline tumor. FIG. 9A, FIG. 9B, FIG. 9C, and FIG. 9D show example MRI data showing scans of the head of a patient. FIG. 9A shows an axial T1 sequence slice containing most apical image, including orbits used to measure head size. FIG. 9B shows a coronal T1 sequence slice selecting image at level of ear canal used to measure head size. FIG. 9C shows a postcontrast T1 axial image shows maximal enhancing tumor diameter used to measure tumor location. FIG. 9D shows a postcontrast T1 coronal image shows maximal enhancing tumor diameter used to measure tumor location. MRI measurements may commence from fiducial markers at the outer margin of the scalp and extend tangentially from a right-, anterior-, superior origin. Morphometric head size may be estimated from the axial T1 MRI sequence selecting the most apical image which still included the orbits (or the image directly above the superior edge of the orbits)

In an aspect, the MRI measurements may comprise, for example, one or more of, head size measurements and/or tumor measurements. In an aspect, one or more MRI measurements may be rounded to the nearest millimeter and may be provided to a transducer array placement module (e.g., software) for analysis. The MRI measurements may then be used to generate the three-dimensional array layout map (e.g., three-dimensional array layout map 800).

The MRI measurements may comprise one or more head size measurements such as: a maximal anteroposterior (A-P) head size, commencing measurement from the outer margin of the scalp; a maximal width of the head perpendicular to the A-P measurement: right to left lateral distance; and/or a distance from the far most right margin of the scalp to the anatomical midline.

The MRI measurements may comprise one or more head size measurements such as coronal view head size measurements. Coronal view head size measurements may be obtained on the T1 MRI sequence selecting the image at the level of the ear canal (FIG. 9B). The coronal view head size measurements may comprise one or more of: a vertical measurement from the apex of the scalp to an orthogonal line delineating the inferior margin of the temporal lobes; a maximal right to left lateral head width; and/or a distance from the far right margin of the scalp to the anatomical midline.

The MRI measurements may comprise one or more tumor measurements, such as tumor location measurements. The tumor location measurements may be made using T1 post-contrast MRI sequences, firstly on the axial image demonstrating maximal enhancing tumor diameter (FIG. 9C). The tumor location measurements may comprise one or more of: a maximal A-P head size, excluding the nose; a maximal right to left lateral diameter, measured perpendicular to the A-P distance; a distance from the right margin of the scalp to the anatomical midline; a distance from the right margin of the scalp to the closest tumor margin, measured parallel to the right-left lateral distance and perpendicular to the A-P measurement; a distance from the right margin of the scalp to the farthest tumor margin, measured parallel to the right-left lateral distance, perpendicular to the A-P measurement; a distance from the front of the head, measured parallel to the A-P measurement, to the closest tumor margin; and/or a distance from the front of the head, measured parallel to the A-P measurement, to the farthest tumor margin.

The one or more tumor measurements may comprise coronal view tumor measurements. The coronal view tumor measurements may comprise identifying the postcontrast T1 MRI slice featuring the maximal diameter of tumor enhancement (FIG. 9D). The coronal view tumor measurements may comprise one or more of: a maximal distance from the apex of the scalp to the inferior margin of the cerebrum. In anterior slices, this would be demarcated by a horizontal line drawn at the inferior margin of the frontal or temporal lobes, and posteriorly, it would extend to the lowest level of visible tentorium; a maximal right to left lateral head width; a distance from the right margin of the scalp to the anatomical midline; a distance from the right margin of the scalp to the closest tumor margin, measured parallel to the right-left lateral distance; a distance from the right margin of the scalp to the farthest tumor margin, measured parallel to the right-left lateral distance; a distance from the apex of the head to the closest tumor margin, measured parallel to the superior apex to inferior cerebrum line; and/or a distance from the apex of the head to the farthest tumor margin, measured parallel to the superior apex to inferior cerebrum line.

Other MRI measurements may be used, particularly when the tumor is present in another portion of the patient's body. The MRI measurements may be used by the patient modeling application 608 to generate a patient model. In some instances, measurements may be derived from images other than MRI images, such as images (e.g., the imaging data 610, etc.) derived radiography, ultrasound, elastography, photoacoustic imaging, positron emission tomography, echocardiography, magnetic particle imaging, functional near-infrared spectroscopy, and/or the like. Any images may be used to generate the patient model. The patient model may be used to optimize TTFields treatment planning. For example, the patient model may have electric properties assigned to various tissue types identified in the model, and the patient model may be used to determine the three-dimensional array layout map (e.g., three-dimensional array layout map 800). Table 1 shows standard electrical properties of tissues that may be used in simulations.

TABLE 1

| Tissue Type | Conductivity, S/m | Relative Permittivity |
| --- | --- | --- |
| Scalp | 0.3 | 5000 |
| Skull | 0.08 | 200 |

TABLE 1-continued

| Tissue Type | Conductivity, S/m | Relative Permittivity |
| --- | --- | --- |
| Cerebrospinal fluid | 1.79 | 110 |
| Gray matter | 0.25 | 3000 |
| White matter | 0.12 | 2000 |
| Enhancing tumor | 0.24 | 2000 |
| Enhancing nontumor | 0.36 | 1170 |
| Resection cavity | 1.79 | 110 |
| Necrotic tumor | 1 | 110 |
| Hematoma | 0.3 | 2000 |
| Ischemia | 0.18 | 2500 |
| Atrophy | 1 | 110 |
| Air | 0 | 0 |

Continuing the example of a tumor within the head of a patient, a healthy head model may be generated which serves as a deformable template from which patient models can be created. When creating a patient model, the tumor may be segmented from the patient's MRI data (e.g., the one or more MRI measurements). Segmenting the MRI data identifies the tissue type in each voxel, and electric properties may be assigned to each tissue type based on empirical data. The region of the tumor in the patient MRI data may be masked, and non-rigid registration algorithms may be used to register the remaining regions of the patient head on to a 3D discrete image representing the deformable template of the healthy head model. This process yields a non-rigid transformation that maps the healthy portion of the patient's head into the template space, as well as the inverse transformation that maps the template into the patient space. The inverse transformation is applied to the 3D deformable template to yield an approximation of the patient's head in the absence of a tumor. Finally, the tumor (referred to as a region-of-interest (ROI)) is planted back into the deformed template to yield the full patient model. The patient model may be a digital representation in three-dimensional space of the portion of the patient's body, including internal structures, such as tissues, organs, tumors, etc.

The images (e.g., three-dimensional (3D) images, etc.) derived from the image data 610 may include a plurality of voxels that represent the anatomical structures (e.g., tissue, organs, tumors, etc.) present in the patient from which the model is derived. For example, each voxel of the images may be assigned to three types of structures: a tissue structure, a region-of-interest (ROI) structure, and an avoidance type structure. A tissue type structure may define the tissue type (e.g., grey matter, white matter, skin, skull, enhancing tumor, etc.) and associated electrical properties (e.g., conductivity, relative permittivity, etc.) of a voxel within the image. An ROI structure may include collections of voxels of the patient model that are of interest to a user. For example, the user may want to optimize treatment by maximizing the power loss associated with an electric field within a specific ROI, or may want to calculate average field intensities within a specific ROI. Avoidance area type structures may include areas within the image (and/or patient model) where transducer array placement should be avoided when simulating TTField delivery.

Figure 10A:
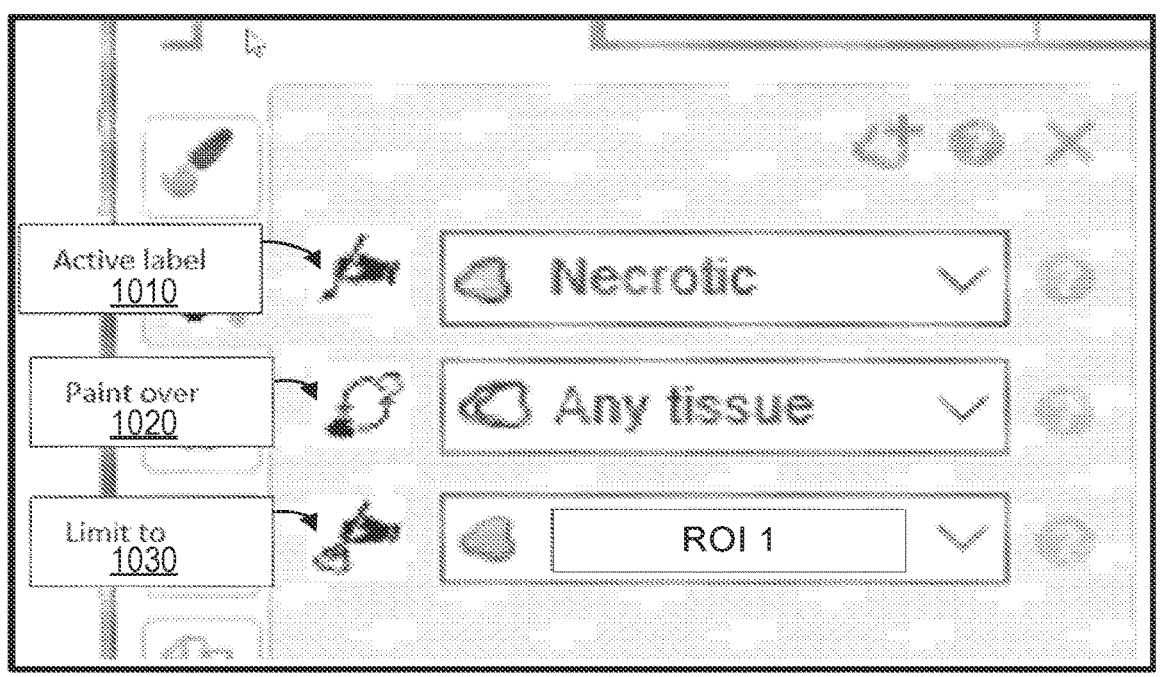
FIG. 10A shows an example user interface for segmenting images.

The patient modeling application 608 may include semi-automatic tools/functions that enable a user to segment images used to create a patient model and assign voxels to the various structures. In some instances, the patient modeling application 608 may employ write-over logic and/or tools that enable a user to segment the images. For example, when segmenting images, the user may assign voxels to a specific structure via an automatic/semi-automatic tools and/or manual tool such as a paintbrush. The user may limit the region to/from which the voxels are being assigned. The user may select/indicate an active label for a structure to which voxels will be assigned during segmentation. The user may select/indicate a paint-over label for voxels that will be painted over (e.g., overwritten, etc.), such as voxels within the structure that will be assigned to a target structure defined by the active label. The user may select/indicate a limit-to label to define a structure to which segmentation should be limited. For example, voxels able to be assigned the active label may be limited to voxels assigned to a structure associated with the paint-over label and a structure associated with the limit-to label during segmentation. For example, if a user is using the patient modeling application 608 to segment a tumor into different tissue types, the user may choose "active tumor" (e.g., the tumor being segmented) as the active label. The user may use the patient modeling application 608 to overwrite voxels that have not been assigned to a tissue type and may use the patient modeling application 608 to limit segmentation to an ROI defining the volume of the tumor being segmented. FIG. 10A illustrates a user interface 1000 of the patient modeling application 608. The user interface 1000 may be an interactive element of the patient modeling application 608, such as a screen, page, and/or the like. As illustrated, a user has selected an active label 1010 that assigns voxels of an image to a structure called necrotic. A paint-over label 1020 indicates "any tissue", which indicates that any new voxel assignment may overwrite any voxel previously assigned to any kind of tissue structure within the image. A limit to label 1030 indicates that segmentation is limited to (e.g., may only affect, may overwrite, etc.) voxels of the image assigned to a region of interest, such as "ROI 1."

Figure 10B:
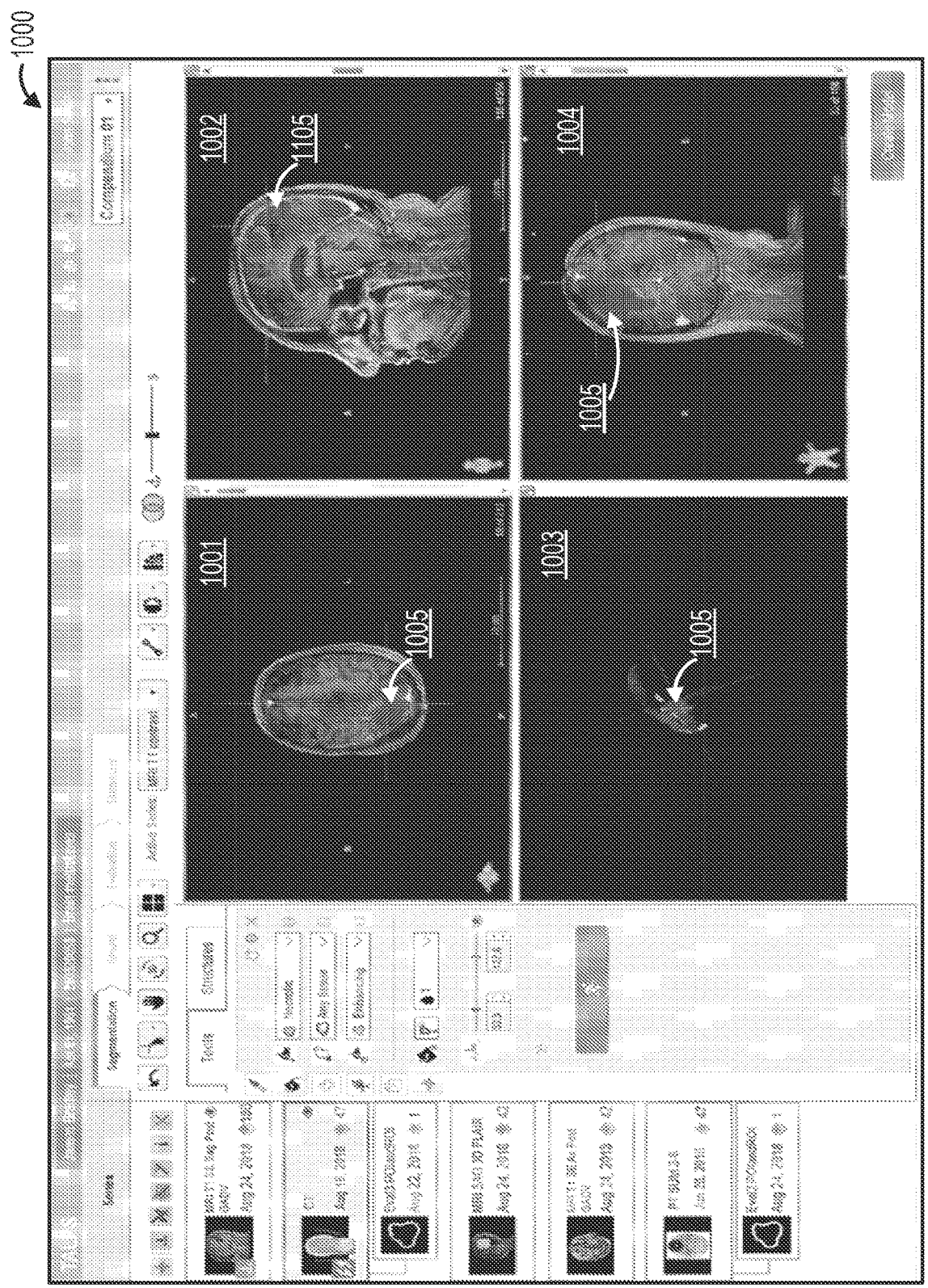
FIG. 10B shows an example user interface for segmenting images.
Figure 10C:
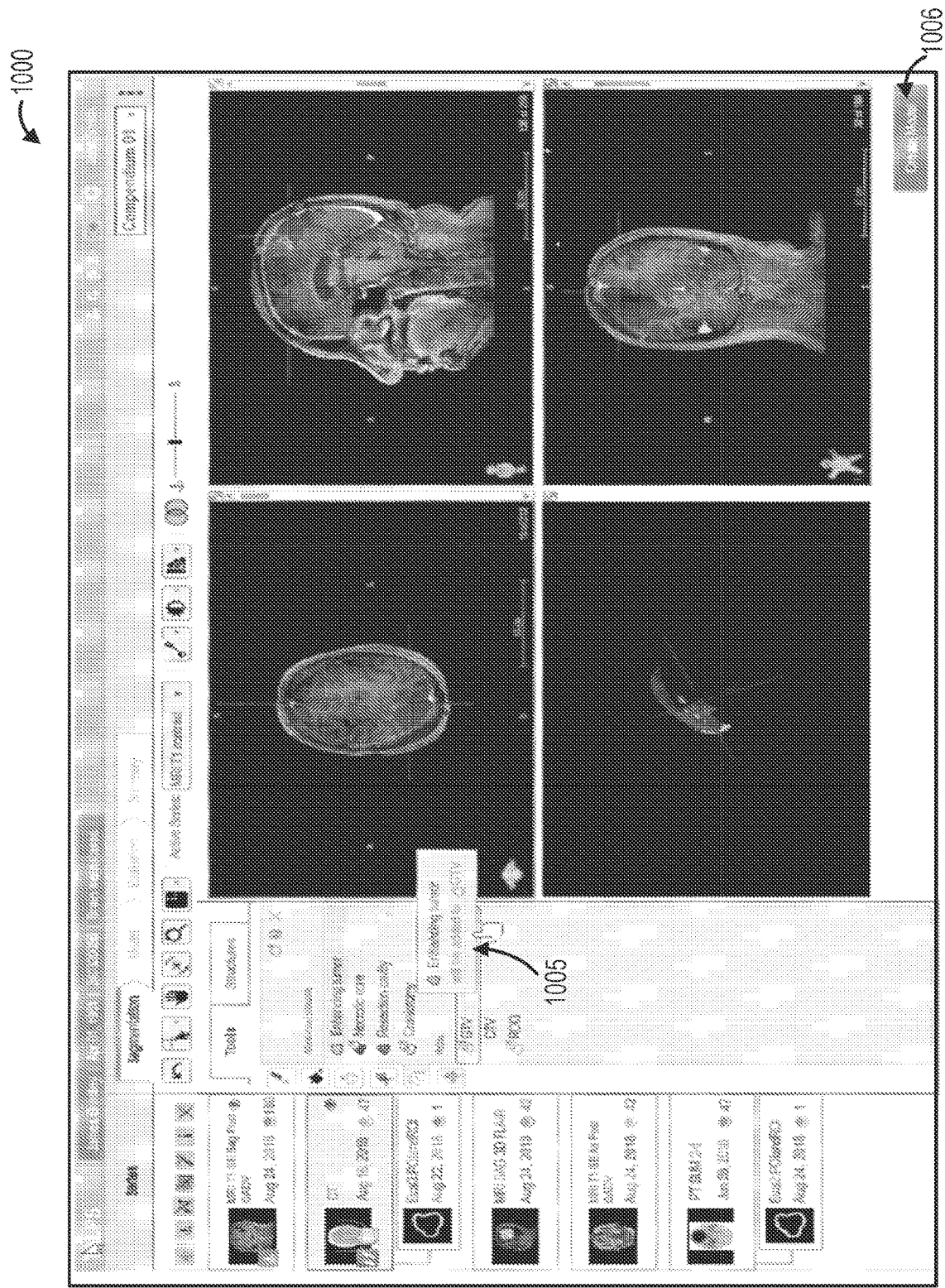
FIG. 10C shows an example user interface for segmenting images.

In some instances, the patient modeling application 608 may include one or more interactive fill-type algorithms (e.g., a region-growing algorithm, a level-set algorithm, an active contour-based algorithm, etc.) that segment ROIs from an image based on a seed-voxel (e.g., a seed-volume/curve, etc.) within the ROI. When the patient modeling application 608 initiates segmentation, the seed-voxel may change shape until it captures a connected region in the image (e.g., a foreground, etc.) that is distinguishable from the surroundings (e.g., a background, etc.) based on characteristics such as gray-scale levels, patterns/texture within the region, distinct edges between foreground and background, and/or the like. FIG. 10B illustrates the user interface 1000 of the patient modeling application 608. In some instances, the user interface 1000 may be an interactive element of the patient modeling application 608 that enables any/all user actions to be performed via the user interface 1000, such as a single screen, page, and/or the like. In some instances, the user interface 1000 may include multiple screens, pages, and/or the like. When initiated, the user interface 1000 may enable a user to use an interactive tool (e.g., a mouse, cursor, keyboard, etc.) to place seeds (e.g., seed voxels, etc.) in an image, such as images 1001, 1002, 1003, and 1004. When a seed is placed, an ROI 1005 may be displayed in the images 1001, 1002, 1003, and 1004 and an automatic threshold may be performed. The patient modeling application 608 may receive one or more instructions/signals (e.g., via the interactive tool, etc.) to change the shape and/or location of the ROI, change the thresholds used to separate foreground and background, delete and/or add additional seeds, and/or the like. In some instances, any seed placed outside an ROI may be ignored. The ROI may be updated based on the seed location. The user interface 1000 enables the patient modeling application 608 to receive instructions/signals (e.g., instructions to place/adjust seeds, instructions to set thresholds, instructions to change a shape/location of an ROI, etc.) in an iterative and non-sequential manner. In some instances, interaction with the user interface 1000 may cause the patient modeling application 608 to terminate, cease, and/or pause initiation/progress of a region-fill algorithm in specific regions of the images 1001, 1002, 1003, and 1004. For example, the interactive tool may be used to mark voxels of the images 1001, 1002, 1003, and 1004 and form a barrier beyond which a region of segmentation cannot grow. For example, if a user is using the user interface 1000 of the patient modeling application 608 to segment a resection cavity depicted in an image located close to ventricles depicted in the image, voxels may be marked/selected to indicate a blocking region located at the boundary between the resection cavity and the ventricles. The marked/selected voxels may form a boundary that the region-fill algorithms cannot pass through to ensure that the resection cavity is segmented correctly without the region flowing into the ventricles. In some instances, the user interface 1000 may include one or more advanced options that enable voxels to be marked/selected and/or one or more boundaries within images to be created.

In some instances, the user interface 1000 may enable the assignment of a first structure represented in an image to a second structure represented in the image, by associating all voxels associated with the first structure with the second structure. For example, as shown in FIG. 10B at 1006 voxels associated with an ROI indicates/denotes a gross tumor volume (GTV) may be assigned to a tissue type of enhancing tumor. The assignment of voxels to structures may be based on the patient modeling application 608 receiving one or more instructions/signals via any method/means. In some instances, the assignment of voxels to structures may be based on the patient modeling application 608 receiving one or more instructions/signals via the interactive tool, such as clicking (e.g., a mouse click, etc.) and/or dragging instructions. For example, to assign voxels belonging to the first structure to the second structure, a user may move the interactive tool over the first structure, click/select/mark the first structure via the interactive tool, drag, via the interactive tool, the first structure to the second structure, and drop, via the interactive tool, the first structure of the second structure (e.g., cause coordinates of voxels of the first structure to be associated with coordinates of voxels of the second structure, etc.). Any number of structures may be assigned to another structure. Once images have been segmented, an interactive component 1006 of the user interface 1000 may be selected (e.g., interacted with, etc.) to cause the patient modeling application 608 to generate/create a patient model.

Delivery of TTFields may be simulated by the patient modeling application 608 using the patient model. Simulated electric field distributions, dosimetry, and simulation-based analysis are described in U.S. Patent Publication No. 20190117956 A1 and Publication "Correlation of Tumor treating Fields Dosimetry to Survival Outcomes in Newly Diagnosed Glioblastoma: A Large-Scale Numerical Simulation-based Analysis of Data from the Phase 3 EF-14 randomized Trial" by Ballo, et al. (2019) which are incorporated herein by reference in their entirety.

To ensure systematic positioning of the transducer arrays relative to the tumor location, a reference coordinate system may be defined. For example, a transversal plane may initially be defined by conventional LR and AP positioning of the transducer arrays. The left-right direction may be defined as the x-axis, the AP direction may be defined as the y-axis, and the craniocaudal direction normal to the XY-plane may be defined as the Z-axis.

After defining the coordinate system, transducer arrays may be virtually placed on the patient model with their centers and longitudinal axes in the XY-plane. A pair of transducer arrays may be systematically rotated around the z-axis of the head model, i.e. in the XY-plane, from 0 to 180 degrees, thereby covering the entire circumference of the head (by symmetry). The rotation interval may be, for example, 15 degrees, corresponding to approximately 2 cm translations, giving a total of twelve different positions in the range of 180 degrees. Other rotation intervals are contemplated. Electric field distribution calculations may be performed for each transducer array position relative to tumor coordinates.

Electric field distribution in the patient model may be determined by the patient modeling application 608 using a finite element (FE) approximation of electrical potential. In general, the quantities defining a time-varying electromagnetic field are given by the complex Maxwell equations. However, in biological tissues and at the low to intermediate frequency of TTFields (f=200 kHz), the electromagnetic wavelength is much larger than the size of the head and the electric permittivity $\varepsilon$ is negligible compared to the real-valued electric conductivity $\sigma$, i.e., where $\omega=2\pi f$ is the angular frequency. This implies that the electromagnetic propagation effects and capacitive effects in the tissue are negligible, so the scalar electric potential may be well approximated by the static Laplace equation $\nabla\cdot(\sigma\nabla\phi)=0$, with appropriate boundary conditions at the electrodes and skin. Thus, the complex impedance is treated as resistive (i.e. reactance is negligible) and currents flowing within the volume conductor are, therefore, mainly free (Ohmic) currents. The FE approximation of Laplace's equation was calculated using the SimNIBS software (simnibs.org). Computations were based on the Galerkin method and the residuals for the conjugate gradient solver were required to be <1E-9. Dirichlet boundary conditions were used with the electric potential was set to (arbitrarily chosen) fixed values at each set of electrode arrays. The electric (vector) field was calculated as the numerical gradient of the electric potential and the current density (vector field) was computed from the electric field using Ohm's law. The potential difference of the electric field values and the current densities were linearly rescaled to ensure a total peak-to-peak amplitude for each array pair of 1.8 A, calculated as the (numerical) surface integral of the normal current density components over all triangular surface elements on the active electrode discs. This corresponds to the current level used for clinical TTFields therapy by the Optune® device. The "dose" of TTFields was calculated as the intensity (L2 norm) of the field vectors. The modeled current is assumed to be provided by two separate and sequentially active sources each connected to a pair of 3×3 transducer arrays. The left and posterior arrays may be defined to be sources in the simulations, while the right and anterior arrays were the corresponding sinks, respectively. However, as TTFields employ alternating fields, this choice is arbitrary and does not influence the results.

An average electric field strength generated by transducer arrays placed at multiple locations on the patient may be determined by the patient modeling application 608 for one or more tissue types. In an aspect, the transducer array position that corresponds to the highest average electric field strength in the tumor tissue type(s) may be selected as a desired (e.g., optimal) transducer array position for the patient. In another aspect, one or more candidate positions for a transducer array(s) may be excluded as a result of a physical condition of the patient. For example, one or more candidate positions may be excluded based on areas of skin irritation, scars, surgical sites, discomfort, etc. Accordingly, the transducer array position that corresponds to the highest average electric field strength in the tumor tissue type(s), after excluding one or more candidate positions, may be selected as a desired (e.g., optimal) transducer array position for the patient. Thus, a transducer array position may be selected that results in less than the maximum possible average electric field strength.

The patient model may be modified to include an indication of the desired transducer array position. The resulting patient model, comprising the indication(s) of the desired transducer array position(s), may be referred to as the three-dimensional array layout map (e.g., three-dimensional array layout map 600). The three-dimensional array layout map may thus comprise a digital representation, in three-dimensional space, of the portion of the patient's body, an indication of tumor location, an indication of a position for placement of one or more transducer arrays, combinations thereof, and the like.

The three-dimensional array layout map may be provided to the patient in a digital form and/or a physical form. The patient, and/or a patient caregiver, may use the three-dimensional array layout map to affix one or more transducer arrays to an associated portion of the patient's body (e.g., head).

Figure 11:
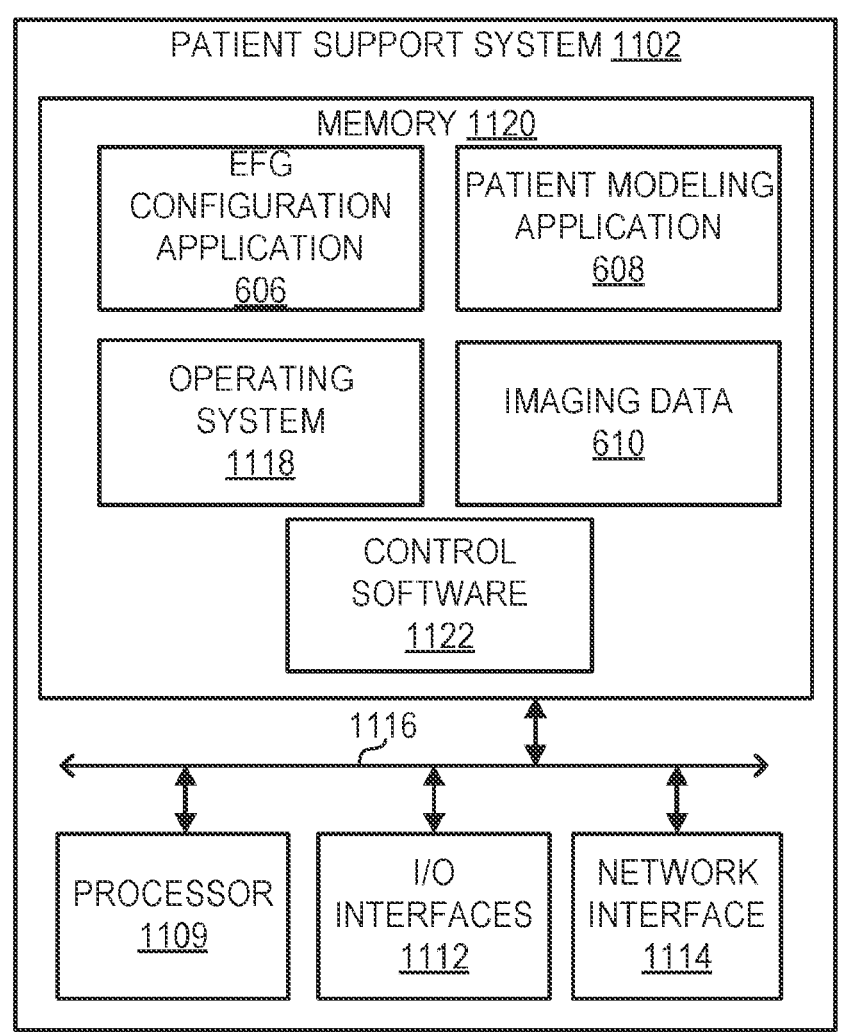
FIG. 11 is a block diagram depicting an example operating environment.

FIG. 11 is a block diagram depicting an environment 1100 comprising a non-limiting example of the patient support system 104. In an aspect, some or all steps of any described method may be performed on a computing device as described herein. The patient support system 104 can comprise one or multiple computers configured to store one or more of the EFG configuration application 606, the patient modeling application 608, the imaging data 610, and the like.

The patient support system 104 can be a digital computer that, in terms of hardware architecture, generally includes a processor 1109, memory system 1120, input/output (I/O) interfaces 1112, and network interfaces 1114. These components (1109, 1120, 1112, and 1114) are communicatively coupled via a local interface 1116. The local interface 1016 can be, for example, but not limited to, one or more buses or other wired or wireless connections, as is known in the art. The local interface 1016 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1109 can be a hardware device for executing software, particularly that stored in memory system 1120. The processor 11109 can be any custom made or commercially available processor, a central processing unit (CPU), an auxiliary processor among several processors associated with the patient support system 104, a semiconductor-based microprocessor (in the form of a microchip or chipset), or generally any device for executing software instructions. When the patient support system 104 is in operation, the processor 1109 can be configured to execute software stored within the memory system 1120, to communicate data to and from the memory system 1120, and to generally control operations of the patient support system 104 pursuant to the software.

The I/O interfaces 1112 can be used to receive user input from and/or for providing system output to one or more devices or components. User input can be provided via, for example, a keyboard and/or a mouse. System output can be provided via a display device and a printer (not shown). I/O interfaces 1112 can include, for example, a serial port, a parallel port, a Small Computer System Interface (SCSI), an IR interface, an RF interface, and/or a universal serial bus (USB) interface.

The network interface 1114 can be used to transmit and receive from the patient support system 104. The network interface 1114 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 1114 may include address, control, and/or data connections to enable appropriate communications.

The memory system 1120 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1120 may incorporate electronic, magnetic, optical, and/or other types of storage media. Note that the memory system 1120 can have a distributed architecture, where various components are situated remote from one another, but can be accessed by the processor 1109.

The software in memory system 1120 may include one or more software programs, each of which comprises an ordered listing of executable instructions for implementing logical functions. In the example of FIG. 11, the software in the memory system 1120 of the patient support system 104 can comprise the EFG configuration application 606, the patient modeling application 608, the imaging data 610, and a suitable operating system (O/S) 1118. The operating system 1118 essentially controls the execution of other computer programs and provides scheduling, input-output control, file and data management, memory management, communication control, and related services.

For purposes of illustration, application programs and other executable program components such as the operating system 1118 are illustrated herein as discrete blocks, although it is recognized that such programs and components can reside at various times in different storage components of the patient support system 104. An implementation of the EFG configuration application 606, the patient modeling application 608, the imaging data 610, and/or the control software 1122 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" can comprise volatile and non-volatile, removable and non-removable media implemented in any methods or technology for storage of information such as computer-readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an embodiment, illustrated in FIG. 12, one or more of the apparatus 100, the patient support system 602, the patient modeling application 608, and/any other device/component described herein can be configured to perform a method 1200 comprising, at 1210, determining a three-dimensional (3D) model, wherein the 3D model comprises a plurality of voxels.

At 1220, receiving an indication of a selection of an active label, wherein the selection of the active label enables a user indicator to cause voxels of the plurality of voxels that are interacted with to be associated with the active label. The user indicator may include one or more of a mouse, a keyboard, a tactile responsive interface (e.g., a touch screen, etc.), and/or the like.

At 1230, receiving an indication of a selection of a paint-over label, wherein the selection of the paint-over label causes voxels of the plurality of voxels not associated with the paint-over label to be write-protected from being associated with the active label.

At 1240, receiving an indication of a selection of a limit-to label that specifies a structure within the 3D model, wherein the selection of the limit-to label causes voxels of the plurality of voxels that are not associated with the structure within the 3D model to be write-protected from being associated with the active label.

At 1250, causing one or more voxels of the plurality of voxels associated with the paint-over label and the limit-to label to be associated with the active label based on an interaction with the one or more voxels via the user indicator.

In some instances, the method 1200 may include causing display of the 3D model.

In some instances, the method 1200 may include receiving, via the user indicator, an interaction with another one or more voxels of the plurality of voxels, determining that the another one or more voxels are associated with the paint-over label and not the limit-to label, and ignoring, based on determining that the another one or more voxels are associated with the paint-over label and not the limit-to label, the interaction with the another one or more voxels.

In some instances, the method 1200 may include receiving, via the user indicator, an interaction with another one or more voxels of the plurality of voxels, determining that the another one or more voxels are not associated with the paint-over label or the limit-to label, and ignoring, based on determining that the another one or more voxels are not associated with the paint-over label or the limit-to label, the interaction with the another one or more voxels.

In some instances, the method 1200 may include receiving, via the user indicator, an interaction with another one or more voxels of the plurality of voxels, determining that the another one or more voxels are associated with the limit-to label and not associated with the paint-over label, and ignoring, based on determining that the another one or more voxels are associated with the limit-to label and not associated with the paint-over label, the interaction with the another one or more voxels.

In an embodiment, illustrated in FIG. 13, one or more of the apparatus 100, the patient support system 602, the patient modeling application 608, and/any other device/component described herein can be configured to perform a method 1300 comprising, at 1310, determining a three-dimensional (3D) model, wherein the 3D model comprises a plurality of voxels, wherein each voxel of the plurality of voxels is associated with an illumination intensity value, wherein each voxel of the plurality of voxels is associated with a represented foreground of the 3D model or a represented background of the 3D model based on the respective illumination intensity value. In some instances, an illumination intensity value may be associated with a RGB color.

At 1320, causing display of an interactive element. In some instances, the interactive element may be a single screen, page, and/or the like that enable all interactive steps of the method 1300 to be performed via the single screen, page, and/or the like.

At 1330, receiving, via the interactive element, an indication of a selection of a seed voxel, wherein the seed voxel is associated with an illumination intensity of a specific value.

At 1340, determining one or more voxels of the plurality of voxels with illumination intensity values within a threshold range of the specific value, wherein the one or more voxels of the plurality of voxels with the illumination intensity values within the threshold range of the specific value are associated with a region of interest (ROI) within the 3D structure.

At 1350, causing one or more of a change in the illumination intensity values of one or more voxels associated with the ROI and a change of the illumination intensity values of one or more voxels of the plurality of voxels.

At 1360, causing, based on one or more of the change in the illumination intensity values of the one or more voxels associated with the ROI, and the change of the illumination intensity values of the one or more voxels of the plurality of voxels, one or more of a change in a represented shape of the ROI, and a change in a location of the ROI within the 3D model.

At 1370, repeating, based on an interaction with the interactive element via a user indicator, one or more of steps 1330-1360.

At 1380, associating, based on another interaction with the interactive element via the user indicator, one or more voxels of the plurality of voxels with a boundary within the ROI, wherein the illumination intensity values of the one or more voxels associated with the boundary match the specific value.

At 1390, causing the illumination intensity value of one or more voxels within the boundary to match the specific value.

In an embodiment, illustrated in FIG. 14, one or more of the apparatus 100, the patient support system 602, the patient modeling application 608, and/any other device/component described herein can be configured to perform a method 1400 comprising, at 1410, determining a three-dimensional (3D) model, wherein the 3D model comprises a plurality of voxels, wherein each voxel of the plurality of voxels is associated with coordinates within the 3D model.

At 1420, determining a structure within the 3D model, wherein the structure comprises one or more voxels of the plurality of voxels.

At 1430, determining another structure within the 3D model, wherein the another structure comprises another one or more voxels of the plurality of voxels.

At 1440, receiving, an indication of a selection of the another one or more voxels.

At 1450, receiving, based on the indication of the selection of the another one or more voxels, a request to change the coordinates of the another one or more voxels.

At 1460, changing, based on the request, the coordinates of the another one or more voxels, wherein changing the coordinates associates the another structure with the structure.

In view of the described apparatuses, systems, and methods and variations thereof, herein below are described certain more particularly described embodiments of the invention. These particularly recited embodiments should not however be interpreted to have any limiting effect on any different claims containing different or more general teachings described herein, or that the "particular" embodiments are somehow limited in some way other than the inherent meanings of the language literally used therein.

Embodiment 1: A method comprising: determining a three-dimensional (3D) model, wherein the 3D model comprises a plurality of voxels, receiving an indication of a selection of an active label, wherein the selection of the active label enables a user indicator to cause voxels of the plurality of voxels that are interacted with to be associated with the active label, receiving an indication of a selection of a paint-over label, wherein the selection of the paint-over label causes voxels of the plurality of voxels not associated with the paint-over label to be write-protected from being associated with the active label, receiving an indication of a selection of a limit-to label that specifies a structure within the 3D model, wherein the selection of the limit-to label causes voxels of the plurality of voxels that are not associated with the structure within the 3D model to be write-protected from being associated with the active label; and causing one or more voxels of the plurality of voxels associated with the paint-over label and the limit-to label to be associated with the active label based on an interaction with the one or more voxels via the user indicator Embodiment 2: The embodiment as in any one of the preceding embodiments further comprising causing display of the 3D model.

Embodiment 3: The embodiment as in any one of the preceding embodiments, wherein the user indicator comprises one or more of a mouse, a keyboard, or a tactile responsive interface.

Embodiment 4: The embodiment as in any one of the preceding embodiments, further comprising receiving, via the user indicator, an interaction with another one or more voxels of the plurality of voxels, determining that the another one or more voxels are associated with the paint-over label and not the limit-to label, and ignoring, based on determining that the another one or more voxels are associated with the paint-over label and not the limit-to label, the interaction with the another one or more voxels.

Embodiment 5: The embodiment as in any one of the embodiments 1-3, further comprising receiving, via the user indicator, an interaction with another one or more voxels of the plurality of voxels, determining that the another one or more voxels are not associated with the paint-over label or the limit-to label, and ignoring, based on determining that the another one or more voxels are not associated with the paint-over label or the limit-to label, the interaction with the another one or more voxels.

Embodiment 6: The embodiment as in any one of the embodiments 1-3, further comprising receiving, via the user indicator, an interaction with another one or more voxels of the plurality of voxels, determining that the another one or more voxels are associated with the limit-to label and not associated with the paint-over label, and ignoring, based on determining that the another one or more voxels are associated with the limit-to label and not associated with the paint-over label, the interaction with the another one or more voxels.

Embodiment 7: A method comprising: (a) determining a three-dimensional (3D) model, wherein the 3D model comprises a plurality of voxels, wherein each voxel of the plurality of voxels is associated with an illumination intensity value, wherein each voxel of the plurality of voxels is associated with a represented foreground of the 3D model or a represented background of the 3D model based on the respective illumination intensity value, (b) causing display of an interactive element, (c) receiving, via the interactive element, an indication of a selection of a seed voxel, wherein the seed voxel is associated with an illumination intensity of a specific value, (d) determining one or more voxels of the plurality of voxels with illumination intensity values within a threshold range of the specific value, wherein the one or more voxels of the plurality of voxels with the illumination intensity values within the threshold range of the specific value are associated with a region of interest (ROI) within the 3D structure, (e) causing one or more of a change in the illumination intensity values of one or more voxels associated with the ROI and a change of the illumination intensity values of one or more voxels of the plurality of voxels, (f) causing, based on one or more of the change in the illumination intensity values of the one or more voxels associated with the ROI, and the change of the illumination intensity values of the one or more voxels of the plurality of voxels, one or more of a change in a represented shape of the ROI, and a change in a location of the ROI within the 3D model, (g) repeating, based on an interaction with the interactive element via a user indicator, one or more of steps (c)-(f), (h) associating, based on another interaction with the interactive element via the user indicator, one or more voxels of the plurality of voxels with a boundary within the ROI, wherein the illumination intensity values of the one or more voxels associated with the boundary match the specific value, and (i) causing the illumination intensity value of one or more voxels within the boundary to match the specific value.

Embodiment 8: The embodiment as in the embodiment 7, wherein an illumination intensity value is associated with a RGB color.

Embodiment 9: A method comprising: determining a three-dimensional (3D) model, wherein the 3D model comprises a plurality of voxels, wherein each voxel of the plurality of voxels is associated with coordinates within the 3D model, determining a structure within the 3D model, wherein the structure comprises one or more voxels of the plurality of voxels, determining another structure within the 3D model, wherein the another structure comprises another one or more voxels of the plurality of voxels, receiving, an indication of a selection of the another one or more voxels, receiving, based on the indication of the selection of the another one or more voxels, a request to change the coordinates of the another one or more voxels, and changing, based on the request, the coordinates of the another one or more voxels, wherein changing the coordinates associates the another structure with the structure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   (a) determining a three-dimensional (3D) model, wherein the 3D model comprises a plurality of voxels, wherein each voxel of the plurality of voxels is associated with an illumination intensity value, wherein each voxel of the plurality of voxels is associated with a represented foreground of the 3D model or a represented background of the 3D model based on the respective illumination intensity value;
   (b) causing display of an interactive element;
   (c) receiving, via the interactive element, an indication of a selection of a seed voxel, wherein the seed voxel is associated with an illumination intensity of a specific value;
   (d) determining one or more voxels of the plurality of voxels with illumination intensity values within a threshold range of the specific value, wherein the one or more voxels of the plurality of voxels with the illumination intensity values within the threshold range of the specific value are associated with a region of interest (ROI) within the 3D structure;
   (e) causing one or more of a change in the illumination intensity values of one or more voxels associated with the ROI and a change of the illumination intensity values of one or more voxels of the plurality of voxels;
   (f) causing, based on one or more of the change in the illumination intensity values of the one or more voxels associated with the ROI, and the change of the illumination intensity values of the one or more voxels of the plurality of voxels, one or more of a change in a represented shape of the ROI, and a change in a location of the ROI within the 3D model;
   (g) repeating, based on an interaction with the interactive element via a user indicator, one or more of steps (c)-(f);
   (h) associating, based on another interaction with the interactive element via the user indicator, one or more voxels of the plurality of voxels with a boundary within the ROI, wherein the illumination intensity values of the one or more voxels associated with the boundary match the specific value; and (i) causing the illumination intensity value of one or more voxels within the boundary to match the specific value.

2. The method of claim 1, wherein determining the 3D model comprises determining the 3D model based on image data.

3. The method of claim 2, wherein the image data comprises one or more of magnetic resonance imaging (MRI) data or computed tomography (CT) image data.

4. The method of claim 1, wherein an illumination intensity value is associated with a RGB color.

5. The method of claim 1, wherein the ROI is associated with a representation of a tumor.

6. The method of claim 1, wherein the plurality of voxels represent anatomical structures.

7. A method comprising:
  determining a three-dimensional (3D) model, wherein the 3D model comprises a plurality of voxels, wherein each voxel of the plurality of voxels is associated with coordinates within the 3D model;
  determining a structure within the 3D model, wherein the structure comprises one or more voxels of the plurality of voxels;
  determining another structure within the 3D model, wherein the another structure comprises another one or more voxels of the plurality of voxels;
  receiving, an indication of a selection of the another one or more voxels;
  receiving, based on the indication of the selection of the another one or more voxels, a request to change the coordinates of the another one or more voxels; and
  changing, based on the request, the coordinates of the another one or more voxels, wherein changing the coordinates associates the another structure with the structure.

8. The method of claim 7, wherein determining the 3D model comprises determining the 3D model based on image data.

9. The method of claim 8, wherein the image data comprises one or more of magnetic resonance imaging (MRI) data or computed tomography (CT) image data.

10. The method of claim 7, wherein the plurality of voxels represent anatomical structures.

11. The method of claim 7, wherein determining the 3D model comprises determining the 3D model based on Finite Element Method (FEM) simulations.

* * * * *